US009652438B2

(12) United States Patent
Audet

(10) Patent No.: US 9,652,438 B2
(45) Date of Patent: *May 16, 2017

(54) METHOD OF DISTINGUISHING DOCUMENTS

(71) Applicant: 9224-5489 QUEBEC INC., Montreal (CA)

(72) Inventor: Mathieu Audet, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 350 days.

This patent is subject to a terminal disclaimer.

(21) Appl. No.: 14/252,186

(22) Filed: Apr. 14, 2014

(65) Prior Publication Data

US 2014/0223297 A1    Aug. 7, 2014

Related U.S. Application Data

(63) Continuation of application No. 13/408,340, filed on Feb. 29, 2012, now abandoned, which is a
(Continued)

(51) Int. Cl.
  *G06F 3/048*    (2013.01)
  *G06F 17/21*    (2006.01)
  *G06F 3/0482*    (2013.01)

(52) U.S. Cl.
  CPC .......... *G06F 17/211* (2013.01); *G06F 3/0482* (2013.01)

(58) Field of Classification Search
  CPC combination set(s) only.
  See application file for complete search history.

(56) References Cited

U.S. PATENT DOCUMENTS 4,616,336 A    10/1986  Robertson
4,653,021 A     3/1987  Takagi
(Continued)

FOREIGN PATENT DOCUMENTS

CA    2323268    10/2000
EP    2568369     3/2013
(Continued)

OTHER PUBLICATIONS

The lifestream approach to reorganizing the information world; Nicolas Carriero, Scott Fertig; Eric Freeman and David Gelernter; Apr. 1995; Yale University; United States.

*Primary Examiner* — Hien Duong
(74) *Attorney, Agent, or Firm* — Mathieu Audet

(57) ABSTRACT

The document relates to a method for visually indicating on a display those documents that have been displayed a plurality of times on a plurality of axes of documents based on a matching value of an attribute, the method comprising providing a first group of documents at least some of which associated with one or more attributes; displaying documents of the first group of documents along a first axis; receiving an input representing a selected attribute of one of the first group of documents that is associated with one or more attributes; displaying to a second axis documents of the first group of documents that has a value matching the value of the user-selected attribute; and displaying a visual distinctive feature for each displayed document in the first group of documents that is displayed along the second axis, whereby a user is able to visualize which documents displayed along the first axis are also displayed on the second axis for having a value matching the value of the selected attribute. A system and a graphical user interface providing same are also provided.

20 Claims, 15 Drawing Sheets

Related U.S. Application Data continuation of application No. 12/400,773, filed on Mar. 9, 2009, now Pat. No. 8,739,050.

(60) Provisional application No. 61/034,625, filed on Mar. 7, 2008, provisional application No. 61/096,655, filed on Sep. 12, 2008.

(56) References Cited

U.S. PATENT DOCUMENTS

| | | |
|---|---|---|
| 4,817,036 A | 3/1989 | Millet et al. |
| 5,101,500 A | 3/1992 | Marui |
| 5,115,504 A | 5/1992 | Belove |
| 5,148,154 A | 9/1992 | MacKay |
| 5,241,624 A | 8/1993 | Torres |
| 5,261,087 A | 11/1993 | Mukaino |
| 5,353,391 A | 10/1994 | Cohen |
| 5,388,197 A | 2/1995 | Rayner |
| 5,398,074 A | 3/1995 | Duffield |
| 5,414,811 A | 5/1995 | Parulski et al. |
| 5,499,330 A | 3/1996 | Lucas et al. |
| 5,519,828 A | 5/1996 | Rayner |
| 5,524,195 A | 6/1996 | Clanton |
| 5,535,063 A | 7/1996 | Lamming |
| 5,537,524 A | 7/1996 | Aprile |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick |
| 5,673,401 A | 9/1997 | Volk |
| 5,677,708 A | 10/1997 | Mattews |
| 5,680,605 A | 10/1997 | Torres |
| 5,682,511 A | 10/1997 | Sposato |
| 5,689,287 A | 11/1997 | Mackinlay |
| 5,701,500 A | 12/1997 | Ikeo |
| 5,713,031 A | 1/1998 | Saito |
| 5,740,815 A | 4/1998 | Alpins |
| 5,751,280 A | 5/1998 | Abbott |
| 5,781,188 A | 7/1998 | Amiot |
| 5,781,785 A | 7/1998 | Rowe |
| 5,786,816 A | 7/1998 | Macrae |
| 5,794,178 A | 8/1998 | Caid |
| 5,798,766 A | 8/1998 | Hayashi et al. |
| 5,812,124 A | 9/1998 | Eick |
| 5,822,751 A | 10/1998 | Gray |
| 5,832,504 A | 11/1998 | Tripathi |
| 5,838,317 A | 11/1998 | Bolnick |
| 5,838,326 A | 11/1998 | Card |
| 5,847,707 A | 12/1998 | Hayashida |
| 5,850,218 A | 12/1998 | LaJoie |
| 5,878,410 A | 3/1999 | Zbikowski |
| 5,880,729 A | 3/1999 | Johnston, Jr. |
| 5,900,879 A | 5/1999 | Berry |
| 5,903,271 A | 5/1999 | Bardon |
| 5,905,992 A | 5/1999 | Lucas |
| 5,920,859 A | 7/1999 | Li |
| 5,926,824 A | 7/1999 | Hashimoto |
| 5,933,843 A | 8/1999 | Takai |
| 5,966,127 A | 10/1999 | Yajima |
| 5,974,391 A | 10/1999 | Hongawa et al. |
| 5,977,974 A | 11/1999 | Hatori et al. |
| 5,980,096 A | 11/1999 | Thalhammer-Reyero |
| 5,982,369 A | 11/1999 | Sciammarella |
| 5,999,173 A | 12/1999 | Ubillos |
| 6,003,034 A | 12/1999 | Thli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,038,522 A | 3/2000 | Manson et al. |
| 6,061,062 A | 5/2000 | Venolia |
| 6,064,384 A | 5/2000 | Ho |
| 6,067,554 A | 5/2000 | Hohensee |
| 6,078,924 A | 6/2000 | Ainsbury |
| 6,081,817 A | 6/2000 | Taguchi |
| 6,088,032 A | 7/2000 | Mackinlay |
| 6,100,887 A | 8/2000 | Bormann et al. |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 | 6/2001 | Aoki |
| 6,253,518 B1 | 7/2001 | Azar |
| 6,262,722 B1 | 7/2001 | Allison |
| 6,266,059 B1 | 7/2001 | Mattews |
| 6,266,098 B1 | 7/2001 | Cove |
| 6,275,229 B1 | 8/2001 | Weiner |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | Destefano |
| 6,310,622 B1 | 10/2001 | Asente |
| 6,313,851 B1 | 11/2001 | Matthews |
| 6,317,761 B1 | 11/2001 | Landsman et al. |
| 6,335,742 B1 | 1/2002 | Takemoto |
| 6,337,698 B1 | 1/2002 | Keely, Jr. |
| 6,338,044 B1 | 1/2002 | Cook et al. |
| 6,344,880 B1 | 2/2002 | Takahashi |
| 6,351,765 B1 | 2/2002 | Pietropaolo et al. |
| 6,353,436 B1 | 3/2002 | Reichlen |
| 6,353,831 B1 | 3/2002 | Gustman |
| 6,366,299 B1 | 4/2002 | Lanning |
| 6,381,362 B1 | 4/2002 | Deshpande et al. |
| 6,388,665 B1 | 5/2002 | Linnett |
| 6,392,651 B1 | 5/2002 | Stradley |
| 6,418,556 B1 | 7/2002 | Bennington |
| 6,425,129 B1 | 7/2002 | Sciammarella |
| 6,434,545 B1 | 8/2002 | MacLeod et al. |
| 6,434,598 B1 | 8/2002 | Gish |
| 6,456,938 B1 | 9/2002 | Barnard |
| 6,457,006 B1 | 9/2002 | Gruenwald |
| 6,457,017 B2 | 9/2002 | Watkins |
| 6,463,431 B1 | 10/2002 | Schmitt |
| 6,466,237 B1 | 10/2002 | Miyao et al. |
| 6,487,557 B1 | 11/2002 | Nagatomo et al. |
| 6,491,585 B1 | 12/2002 | Miyamoto |
| 6,501,469 B1 | 12/2002 | MacPhail |
| 6,507,858 B1 | 1/2003 | Kanerva |
| 6,538,672 B1 | 3/2003 | Dobbelaar |
| 6,542,896 B1 | 4/2003 | Gruenwald |
| 6,553,310 B1 | 4/2003 | Lopke |
| 6,556,225 B1 | 4/2003 | MacPhail |
| 6,577,350 B1 | 6/2003 | Proehl |

(56) References Cited

U.S. PATENT DOCUMENTS

| | | |
|---|---|---|
| 6,581,068 B1 | 6/2003 | Bensoussan et al. |
| 6,587,106 B1 | 7/2003 | Suzuki et al. |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,662,357 B1 | 12/2003 | Bowman-Amuah |
| 6,668,102 B2 | 12/2003 | Chiba |
| 6,671,692 B1 | 12/2003 | Marpe |
| 6,671,693 B1 | 12/2003 | Marpe |
| 6,671,694 B2 | 12/2003 | Baskins et al. |
| 6,675,158 B1 | 1/2004 | Rising |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs et al. |
| 6,690,391 B1 | 2/2004 | Proehl |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono et al. |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada et al. |
| 6,744,967 B2 | 6/2004 | Kaminski et al. |
| 6,754,660 B1 | 6/2004 | MacPhail |
| 6,760,721 B1 | 7/2004 | Chasen |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright et al. |
| 6,879,946 B2 | 4/2005 | Rong |
| 6,889,220 B2 | 5/2005 | Wolff |
| 6,900,807 B1 | 5/2005 | Liongosari et al. |
| 6,901,558 B1 | 5/2005 | Andreas et al. |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording et al. |
| 6,934,916 B1 | 8/2005 | Webb et al. |
| 6,948,124 B2 | 9/2005 | Combs |
| 6,961,900 B1 | 11/2005 | Sprague et al. |
| 6,965,380 B1 | 11/2005 | Kumata et al. |
| 6,973,628 B2 | 12/2005 | Asami |
| 6,983,227 B1 | 1/2006 | Thalhammer-Reyero et al. |
| 6,985,948 B2 | 1/2006 | Taguchi et al. |
| 6,987,220 B2 | 1/2006 | Holcombe |
| 6,990,637 B2 | 1/2006 | Anthony |
| 7,007,034 B1 | 2/2006 | Hartman |
| 7,010,744 B1 | 3/2006 | Torgerson |
| 7,019,741 B2 | 3/2006 | Kelly et al. |
| 7,020,848 B2 | 3/2006 | Rosenzweig |
| 7,054,878 B2 | 5/2006 | Gottsman |
| 7,055,104 B2 | 5/2006 | Billmaier |
| 7,075,550 B2 | 7/2006 | Bonadio |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,218,325 B1 | 5/2007 | Buck |
| 7,220,910 B2 | 5/2007 | Plastina |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski et al. |
| 7,293,228 B1 | 11/2007 | Lessing et al. |
| 7,302,649 B2 | 11/2007 | Ohnishi |
| 7,318,196 B2 | 1/2008 | Crow et al. |
| 7,334,191 B1 | 2/2008 | Sivan |
| 7,336,279 B1 | 2/2008 | Takiguchi |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,363,591 B2 | 4/2008 | Goldthwaite |
| 7,366,994 B2 | 4/2008 | Loui |
| 7,372,473 B2 | 5/2008 | Venolia |
| 7,380,260 B1 | 5/2008 | Billmaier |
| 7,418,674 B2 | 8/2008 | Robbins |
| 7,426,057 B2 | 9/2008 | Mori |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi et al. |
| 7,461,088 B2 | 12/2008 | Thorman |
| 7,502,819 B2 | 3/2009 | Alonso |
| D589,972 S | 4/2009 | Casagrande et al. |
| 7,594,246 B2 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker et al. |
| 7,714,859 B2 | 5/2010 | Shoemaker |
| 7,716,194 B2 | 5/2010 | William et al. |
| 7,716,604 B2 | 5/2010 | Kataoka |
| 7,735,102 B1 | 6/2010 | Billmaier |
| 7,739,598 B2 | 6/2010 | Porter et al. |
| 7,739,622 B2 | 6/2010 | DeLine et al. |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,770,217 B2 | 8/2010 | Pueblas |
| 7,788,247 B2 | 8/2010 | Wang |
| 7,788,592 B2 | 8/2010 | William |
| 7,792,328 B2 | 9/2010 | Albertson et al. |
| 7,818,378 B2 | 10/2010 | Buchheit et al. |
| 7,822,735 B2 | 10/2010 | Suda |
| 7,844,074 B2 | 11/2010 | Moskowitz et al. |
| 7,856,424 B2 | 12/2010 | Cisler |
| 7,870,489 B2 | 1/2011 | Serita |
| 7,899,818 B2 | 3/2011 | Stonehocker |
| 7,902,741 B2 | 3/2011 | Iwanaga |
| 7,949,691 B1 | 5/2011 | de Heer |
| 7,962,522 B2 | 6/2011 | Norris, III |
| 7,991,720 B2 | 8/2011 | Mander |
| 8,001,481 B2 | 8/2011 | Chakra et al. |
| 8,010,508 B2 | 8/2011 | Audet |
| 8,010,892 B2 | 8/2011 | Audet |
| 8,010,903 B2 | 8/2011 | Dieberger et al. |
| 8,069,404 B2 | 11/2011 | Audet |
| 8,078,966 B2 | 12/2011 | Audet |
| 8,091,033 B2 | 1/2012 | Von Sichart et al. |
| 8,099,680 B1 | 1/2012 | Kolde |

(56) References Cited

U.S. PATENT DOCUMENTS

| | | | |
|---|---|---|---|
| 8,136,030 B2 | 3/2012 | Audet | |
| 8,151,185 B2 | 4/2012 | Audet | |
| 8,307,355 B2 | 11/2012 | Capomassi | |
| 8,341,194 B2* | 12/2012 | Gottsman | G06F 17/30398 |
| | | | 345/629 |
| 8,438,188 B2 | 5/2013 | Norris, III | |
| 8,468,467 B2 | 6/2013 | Yamashita | |
| 8,707,169 B2 | 4/2014 | Morita | |
| 8,762,380 B2 | 6/2014 | Shirai | |
| 9,081,498 B2 | 7/2015 | Thorsander | |
| 2001/0003186 A1 | 6/2001 | DeStefano | |
| 2001/0025288 A1 | 9/2001 | Yanase | |
| 2001/0034766 A1 | 10/2001 | Morimoto | |
| 2001/0055017 A1 | 12/2001 | Ording | |
| 2002/0011990 A1 | 1/2002 | Anwar | |
| 2002/0032696 A1 | 3/2002 | Takiguchi | |
| 2002/0033848 A1 | 3/2002 | Sclammarello | |
| 2002/0035563 A1 | 3/2002 | Suda | |
| 2002/0056129 A1 | 5/2002 | Blackketter | |
| 2002/0059215 A1 | 5/2002 | Kotani et al. | |
| 2002/0070958 A1 | 6/2002 | Yeo | |
| 2002/0078440 A1 | 6/2002 | Feinberg | |
| 2002/0087530 A1 | 7/2002 | Smith | |
| 2002/0091739 A1 | 7/2002 | Ferlitsch | |
| 2002/0096831 A1 | 7/2002 | Nakayama | |
| 2002/0101458 A1 | 8/2002 | SanGiovanni | |
| 2002/0105541 A1 | 8/2002 | Endou | |
| 2002/0140719 A1 | 10/2002 | Amir | |
| 2002/0140740 A1 | 10/2002 | Chen | |
| 2002/0143772 A1* | 10/2002 | Gottsman | G06F 17/30528 |
| 2002/0152474 A1 | 10/2002 | Dudkiewicz | |
| 2002/0180795 A1 | 12/2002 | Wright et al. | |
| 2003/0001898 A1 | 1/2003 | Bernhardson | |
| 2003/0001901 A1 | 1/2003 | Crinon et al. | |
| 2003/0030664 A1 | 2/2003 | Parry | |
| 2003/0037051 A1 | 2/2003 | Gruenwald | |
| 2003/0046693 A1 | 3/2003 | Billmaier | |
| 2003/0046694 A1 | 3/2003 | Istvan | |
| 2003/0046695 A1 | 3/2003 | Billmaier | |
| 2003/0052900 A1 | 3/2003 | Card | |
| 2003/0090504 A1* | 5/2003 | Brook | G06F 17/30843 |
| | | | 715/716 |
| 2003/0090524 A1 | 5/2003 | Segerberg | |
| 2003/0093260 A1 | 5/2003 | Dagtas | |
| 2003/0093792 A1 | 5/2003 | Labeeb | |
| 2003/0095149 A1 | 5/2003 | Fredriksson | |
| 2003/0120681 A1 | 6/2003 | Baclawski | |
| 2003/0120737 A1 | 6/2003 | Lytle | |
| 2003/0121055 A1 | 6/2003 | Kaminski et al. | |
| 2003/0128228 A1 | 7/2003 | Crow et al. | |
| 2003/0132971 A1 | 7/2003 | Billmaier | |
| 2003/0140023 A1 | 7/2003 | Ferguson | |
| 2003/0142136 A1 | 7/2003 | Carter | |
| 2003/0149939 A1 | 8/2003 | Hubel | |
| 2003/0156119 A1 | 8/2003 | Bonadio | |
| 2003/0163468 A1 | 8/2003 | Freeman | |
| 2003/0167902 A1 | 9/2003 | Hiner | |
| 2003/0190950 A1 | 10/2003 | Matsumoto | |
| 2003/0206201 A1 | 11/2003 | Ly | |
| 2003/0237047 A1 | 12/2003 | Borson | |
| 2004/0003398 A1 | 1/2004 | Donian et al. | |
| 2004/0024738 A1 | 2/2004 | Yamane | |
| 2004/0054968 A1 | 3/2004 | Savage | |
| 2004/0064473 A1 | 4/2004 | Thomas | |
| 2004/0090439 A1 | 5/2004 | Dillner | |
| 2004/0095376 A1 | 5/2004 | Graham | |
| 2004/0111401 A1 | 6/2004 | Chang | |
| 2004/0125143 A1 | 7/2004 | Deaton | |
| 2004/0128277 A1 | 7/2004 | Mander | |
| 2004/0128377 A1 | 7/2004 | Sadaghiany | |
| 2004/0139143 A1 | 7/2004 | Canakapalli | |
| 2004/0143598 A1 | 7/2004 | Drucker | |
| 2004/0150657 A1 | 8/2004 | Wittenburg | |
| 2004/0160416 A1 | 8/2004 | Venolia | |
| 2004/0163049 A1 | 8/2004 | Mori | |
| 2004/0172593 A1 | 9/2004 | Wong | |
| 2004/0177319 A1 | 9/2004 | Horn | |
| 2004/0189827 A1 | 9/2004 | Kim | |
| 2004/0233238 A1 | 11/2004 | Lahdesmaki | |
| 2004/0233239 A1 | 11/2004 | Lahdesmaki | |
| 2004/0263519 A1 | 12/2004 | Andrews | |
| 2005/0022132 A1 | 1/2005 | Herzberg | |
| 2005/0060343 A1 | 3/2005 | Gottsman | |
| 2005/0060667 A1 | 3/2005 | Robbins | |
| 2005/0119936 A1 | 6/2005 | Buchanan et al. | |
| 2005/0131959 A1 | 6/2005 | Thorman | |
| 2005/0138066 A1 | 6/2005 | Finke-Anlauff | |
| 2005/0210410 A1 | 9/2005 | Ohwa | |
| 2005/0234843 A1 | 10/2005 | Beckius | |
| 2005/0262533 A1 | 11/2005 | Hart | |
| 2005/0289482 A1 | 12/2005 | Anthony | |
| 2006/0000484 A1 | 1/2006 | Romanchik | |
| 2006/0004848 A1 | 1/2006 | Williams | |
| 2006/0013554 A1 | 1/2006 | Poslinski et al. | |
| 2006/0013555 A1 | 1/2006 | Poslinski et al. | |
| 2006/0013556 A1 | 1/2006 | Poslinski et al. | |
| 2006/0013557 A1 | 1/2006 | Poslinski et al. | |
| 2006/0020966 A1 | 1/2006 | Poslinski et al. | |
| 2006/0020971 A1 | 1/2006 | Poslinski et al. | |
| 2006/0041521 A1 | 2/2006 | Oral | |
| 2006/0045470 A1 | 3/2006 | Poslinski et al. | |
| 2006/0048043 A1 | 3/2006 | Kikuchi | |
| 2006/0048076 A1 | 3/2006 | Vronay | |
| 2006/0075338 A1 | 4/2006 | Kusakabe | |
| 2006/0107096 A1 | 5/2006 | Findleton | |
| 2006/0116994 A1 | 6/2006 | Jonker | |
| 2006/0136466 A1 | 6/2006 | Weiner | |
| 2006/0143574 A1 | 6/2006 | Ito | |
| 2006/0155757 A1 | 7/2006 | Williams | |
| 2006/0161867 A1 | 7/2006 | Drucker | |
| 2006/0197782 A1 | 9/2006 | Sellers | |
| 2006/0209069 A1 | 9/2006 | Bacigalupi et al. | |
| 2006/0236251 A1 | 10/2006 | Kataoka | |
| 2006/0242178 A1 | 10/2006 | Butterfield | |
| 2006/0248129 A1 | 11/2006 | Carnes | |
| 2006/0259511 A1 | 11/2006 | Boerries | |
| 2006/0271884 A1 | 11/2006 | Hurst | |
| 2006/0277478 A1 | 12/2006 | Seraji | |
| 2007/0005576 A1 | 1/2007 | Cutrell | |
| 2007/0007884 A1 | 1/2007 | Iwanaga | |
| 2007/0024722 A1 | 2/2007 | Eura | |
| 2007/0061745 A1 | 3/2007 | Anthony | |
| 2007/0061855 A1 | 3/2007 | Serita | |
| 2007/0067290 A1 | 3/2007 | Makela | |
| 2007/0076984 A1 | 4/2007 | Takahashi | |
| 2007/0083505 A1 | 4/2007 | Ferrari | |
| 2007/0083527 A1 | 4/2007 | Wadler et al. | |
| 2007/0094615 A1 | 4/2007 | Endo | |
| 2007/0100842 A1 | 5/2007 | Wykes | |
| 2007/0136687 A1 | 6/2007 | Pak | |
| 2007/0143803 A1 | 6/2007 | Lim et al. | |
| 2007/0156654 A1 | 7/2007 | Ravinarayanan | |
| 2007/0168877 A1 | 7/2007 | Jain et al. | |
| 2007/0171224 A1* | 7/2007 | MacPherson | G06F 3/0481 |
| | | | 345/440 |
| 2007/0185826 A1 | 8/2007 | Brice | |
| 2007/0192749 A1 | 8/2007 | Baudisch | |
| 2007/0204218 A1 | 8/2007 | Weber | |
| 2007/0208679 A1 | 9/2007 | Tseng | |
| 2007/0214169 A1 | 9/2007 | Audet | |
| 2007/0216694 A1 | 9/2007 | Audet | |
| 2007/0220209 A1 | 9/2007 | Maeda et al. | |
| 2007/0239676 A1 | 10/2007 | Stonehocker | |
| 2007/0268522 A1 | 11/2007 | Miyamoto | |
| 2007/0271508 A1 | 11/2007 | Audet | |
| 2008/0000126 A1 | 1/2008 | Teza | |
| 2008/0015911 A1 | 1/2008 | Wang | |
| 2008/0016142 A1 | 1/2008 | Schneider | |
| 2008/0019371 A1 | 1/2008 | Anschutz | |
| 2008/0022199 A1 | 1/2008 | Sako | |
| 2008/0024444 A1 | 1/2008 | Abe | |
| 2008/0040665 A1* | 2/2008 | Waldeck | G06F 3/0482 |
| | | | 715/277 |
| 2008/0046844 A1 | 2/2008 | Sugie | |

(56) References Cited

U.S. PATENT DOCUMENTS

| | | |
|---|---|---|
| 2008/0058106 A1 | 3/2008 | Audet |
| 2008/0059897 A1 | 3/2008 | Dilorenzo |
| 2008/0065995 A1 | 3/2008 | Bell |
| 2008/0071822 A1 | 3/2008 | Audet |
| 2008/0072169 A1 | 3/2008 | Audet |
| 2008/0077756 A1 | 3/2008 | Shibata |
| 2008/0092038 A1 | 4/2008 | Audet |
| 2008/0098323 A1 | 4/2008 | Vallone et al. |
| 2008/0104534 A1 | 5/2008 | Park et al. |
| 2008/0111826 A1 | 5/2008 | Endrikhovski |
| 2008/0118219 A1 | 5/2008 | Chang et al. |
| 2008/0133579 A1 | 6/2008 | Lim |
| 2008/0134013 A1 | 6/2008 | Audet |
| 2008/0134022 A1 | 6/2008 | Audet |
| 2008/0140448 A1 | 6/2008 | Hernandez |
| 2008/0141115 A1 | 6/2008 | Audet |
| 2008/0155474 A1 | 6/2008 | Duhig |
| 2008/0163048 A1 | 7/2008 | Gossweiler, III |
| 2008/0174790 A1 | 7/2008 | Noguchi |
| 2008/0184285 A1 | 7/2008 | Park |
| 2008/0186305 A1 | 8/2008 | Carter |
| 2008/0243778 A1 | 10/2008 | Behnen |
| 2008/0244437 A1 | 10/2008 | Fischer et al. |
| 2008/0256473 A1 | 10/2008 | Chakra et al. |
| 2008/0256474 A1 | 10/2008 | Chakra et al. |
| 2008/0270361 A1 | 10/2008 | Meyer |
| 2008/0270928 A1 | 10/2008 | Chakra et al. |
| 2008/0276178 A1 | 11/2008 | Fadell |
| 2008/0282198 A1 | 11/2008 | Brooks |
| 2008/0294651 A1 | 11/2008 | Masuyama |
| 2008/0295016 A1 | 11/2008 | Audet |
| 2008/0295036 A1 | 11/2008 | Ikeda |
| 2008/0298697 A1 | 12/2008 | Lee |
| 2008/0299989 A1 | 12/2008 | King |
| 2008/0301562 A1 | 12/2008 | Berger |
| 2008/0307343 A1 | 12/2008 | Robert |
| 2008/0307348 A1 | 12/2008 | Jones et al. |
| 2009/0018996 A1 | 1/2009 | Hunt |
| 2009/0019371 A1 | 1/2009 | Audet |
| 2009/0033664 A1* | 2/2009 | Hao ............... G06T 11/206 345/440 |
| 2009/0048981 A1 | 2/2009 | Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0064029 A1 | 3/2009 | Corkran |
| 2009/0064143 A1 | 3/2009 | Bhogal et al. |
| 2009/0070662 A1 | 3/2009 | Audet |
| 2009/0070699 A1 | 3/2009 | Birkill et al. |
| 2009/0083260 A1 | 3/2009 | Artom |
| 2009/0083859 A1 | 3/2009 | Roth et al. |
| 2009/0106684 A1 | 4/2009 | Chakra et al. |
| 2009/0106685 A1 | 4/2009 | Care et al. |
| 2009/0113334 A1 | 4/2009 | Chakra et al. |
| 2009/0116817 A1 | 5/2009 | Kim et al. |
| 2009/0150832 A1 | 6/2009 | Keller et al. |
| 2009/0164933 A1 | 6/2009 | Pederson et al. |
| 2009/0177754 A1 | 7/2009 | Brezina |
| 2009/0199119 A1 | 8/2009 | Park et al. |
| 2009/0199302 A1 | 8/2009 | So |
| 2009/0210862 A1 | 8/2009 | Viswanadha |
| 2009/0217204 A1 | 8/2009 | Yamashita |
| 2009/0228774 A1 | 9/2009 | Matheny |
| 2009/0228788 A1 | 9/2009 | Audet |
| 2009/0235194 A1 | 9/2009 | Arndt et al. |
| 2009/0254850 A1 | 10/2009 | Almeida |
| 2009/0265372 A1 | 10/2009 | Esmann-Jensen |
| 2009/0284658 A1 | 11/2009 | Cho |
| 2009/0287693 A1 | 11/2009 | Audet |
| 2009/0288006 A1 | 11/2009 | Audet |
| 2009/0307629 A1 | 12/2009 | Horiuchi |
| 2009/0319933 A1 | 12/2009 | Zaika et al. |
| 2009/0322756 A1* | 12/2009 | Robertson ......... G06F 17/30716 345/440 |
| 2010/0023500 A1 | 1/2010 | Bascom |
| 2010/0057576 A1 | 3/2010 | Brodersen et al. |
| 2010/0058226 A1 | 3/2010 | Flake |
| 2010/0070919 A1 | 3/2010 | Araumi |
| 2010/0077355 A1 | 3/2010 | Belinsky |
| 2010/0082427 A1 | 4/2010 | Burgener |
| 2010/0082653 A1 | 4/2010 | Nair |
| 2010/0083159 A1 | 4/2010 | Mountain et al. |
| 2010/0094890 A1 | 4/2010 | Bokor |
| 2010/0145976 A1 | 6/2010 | Higgins |
| 2010/0146380 A1 | 6/2010 | Rousso |
| 2010/0150522 A1 | 6/2010 | Schmehl et al. |
| 2010/0169823 A1 | 7/2010 | Audet |
| 2010/0171861 A1 | 7/2010 | Ota et al. |
| 2010/0185509 A1 | 7/2010 | Higgins |
| 2010/0205563 A1 | 8/2010 | Haapsaari |
| 2010/0313158 A1 | 12/2010 | Lee et al. |
| 2010/0313159 A1 | 12/2010 | Decker et al. |
| 2010/0318200 A1 | 12/2010 | Foslien et al. |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0010667 A1 | 1/2011 | Sakai |
| 2011/0012927 A1 | 1/2011 | Lin |
| 2011/0029925 A1 | 2/2011 | Robert |
| 2011/0035700 A1 | 2/2011 | Meaney |
| 2011/0061082 A1 | 3/2011 | Heo et al. |
| 2011/0078166 A1 | 3/2011 | Oliver |
| 2011/0145745 A1 | 6/2011 | Hyeon et al. |
| 2011/0154213 A1 | 6/2011 | Wheatley et al. |
| 2011/0219297 A1 | 9/2011 | Oda |
| 2011/0239149 A1 | 9/2011 | Lazo |
| 2011/0246926 A1 | 10/2011 | Newton |
| 2011/0307814 A1 | 12/2011 | Audet |
| 2012/0159320 A1 | 6/2012 | Audet |
| 2012/0183273 A1 | 7/2012 | Utsuki |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2012/0262398 A1 | 10/2012 | Kim |
| 2013/0080880 A1 | 3/2013 | Cassistat |
| 2013/0080888 A1 | 3/2013 | Audet |
| 2013/0227470 A1 | 8/2013 | Thorsander |
| 2014/0244625 A1 | 8/2014 | Seghezzi |

FOREIGN PATENT DOCUMENTS

| | | |
|---|---|---|
| JP | 07-013971 | 1/1995 |
| JP | 07-085080 | 3/1995 |
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO9903271 | 1/1999 |
| WO | WO 00/65429 | 11/2000 |

(56) References Cited

FOREIGN PATENT DOCUMENTS

| | | |
|---|---|---|
| WO | WO 01/22194 | 3/2001 |
| WO | WO 01/63378 | 8/2001 |
| WO | WO 01/98881 | 12/2001 |
| WO | WO02099241 | 12/2002 |
| WO | WO 03/001345 | 1/2003 |
| WO | WO 03/032199 | 4/2003 |
| WO | WO 2005/045756 | 5/2005 |
| WO | WO 2005/083595 | 9/2005 |
| WO | WO 2007/095997 | 8/2007 |
| WO | WO 2008/030779 | 3/2008 |

* cited by examiner

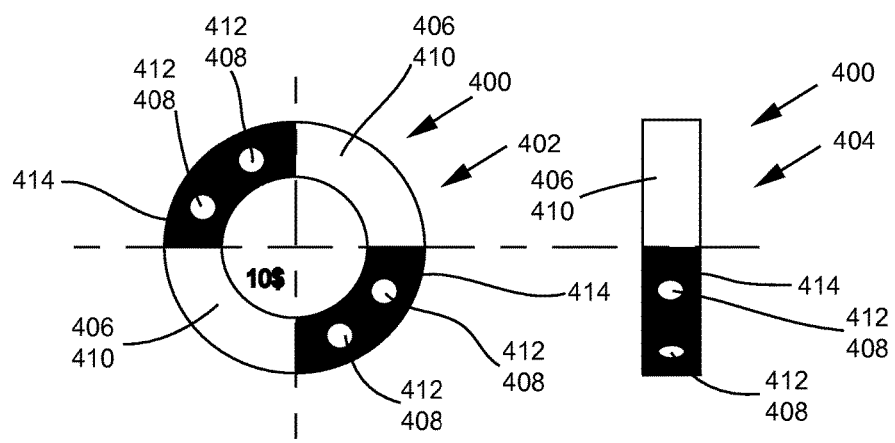
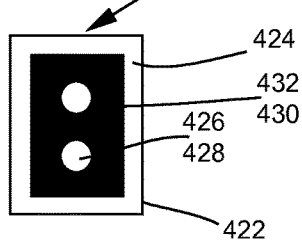
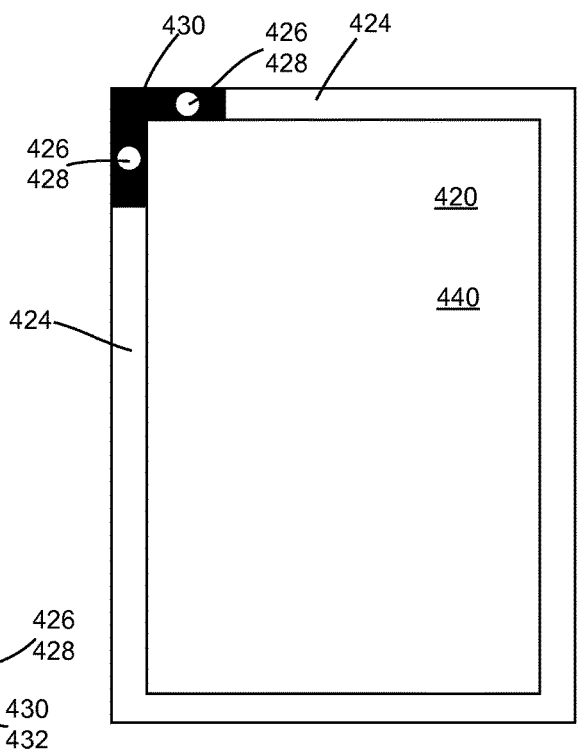

| Enabled | Group of Attributes | Access | Delete |
|---|---|---|---|
| Yes | Vehicle | Engineering [Group] | ⊗ |
| No | Personal | None | ⊗ |
| Yes | Receipes | Cooking [Group] | ⊗ |
| Yes | Business | Emma | ⊗ |
| Yes | Intellectual Property | Patent Agents [Group] | ⊗ |
| No | Travel | Family [Group] | ⊗ |
| No | Default | Jade, Leo, Diane | ⊗ |
|  | ADD NEW |  |  |

| Attribute A | Attribute E | Attribute I | Attribute M |
|---|---|---|---|
| Attribute B | Attribute F | Attribute J | Attribute N |
| Attribute C | Attribute G | Attribute K | Attribute O |
| Attribute D | Attribute H | Attribute L | Attribute P |
Fig. 23
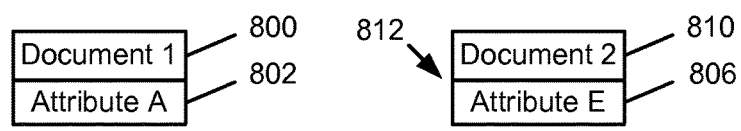
Fig. 24
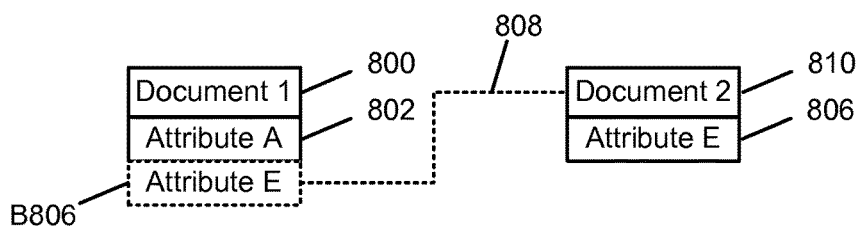
Fig. 25
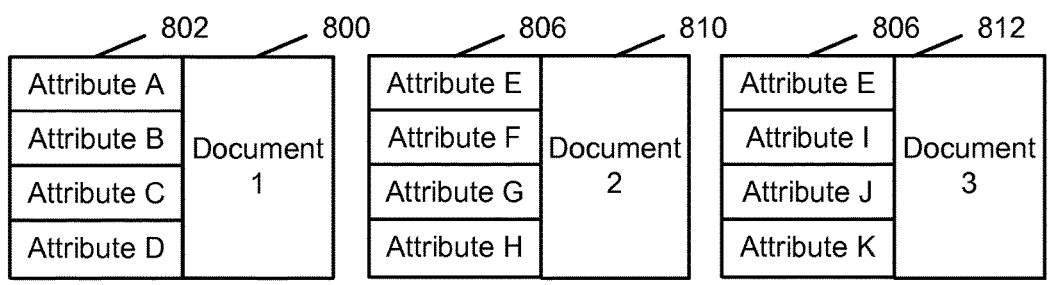
Fig. 26

METHOD OF DISTINGUISHING DOCUMENTS

CROSS-REFERENCE TO RELATED APPLICATIONS

The present invention relates to and claims priority from and is a continuation application of U.S. patent application Ser. No. 13/408,340, entitled METHOD OF MANAGING ATTRIBUTES AND SYSTEM OF MANAGING SAME, filed on Feb. 29, 2012 which claims priority and is a continuation of U.S. patent application Ser. No. 12/400,773, filed Mar. 9, 2009, entitled DOCUMENTS DISCRIMINATION SYSTEM AND METHOD THEREOF, which claims priority from U.S. provisional patent application Ser. 61/034,625, filed Mar. 7, 2008, entitled INTERFACE, U.S. provisional patent application Ser. 61/096,655, filed Sep. 12, 2008, entitled INFORMATION MANAGEMENT TOOL, all these documents are incorporated herein by reference. The present invention also relates to United States Patent Application Publication No.: US 2007/0214169 A1, published Sep. 13, 2007, entitled MULTI-DIMENSIONAL LOCATING SYSTEM AND METHOD and relates to United States Patent Application Publication No.: US 2007/0271508 A1, published Nov. 22, 2007, entitled MULTI-DIMENSIONAL LOCATING SYSTEM AND METHOD. All these documents are incorporated herein by reference in their entireties.

FIELD OF THE INVENTION

This invention relates generally to a computer system and more specifically to a user interface providing methods that facilitate information management and organization. More precisely, the present invention relates to management of a plurality of documents along axes thereof.

BACKGROUND OF THE INVENTION

United States Patent Application Publication No.: US 2007/0214169 A1, published on Sep. 13, 2007 teaches a Multi-dimensional locating system and method (title). United States Patent Application Publication No.: US 2007/0271508 A1, published on Nov. 22, 2007 teaches a Multi-dimensional locating system and method (title). Both patent applications teach ways of managing and displaying documents on arrays of documents. What is taught in these documents have deficiencies.

For instance, one of the deficiencies becomes apparent when a first array of documents presents a group of documents having various attributes (or tags, categories . . . ) associated therewith. When selecting an attribute, either by selecting the attribute, or a document to select an attribute associated therewith, a second array of documents is enabled and displayed. The second array of documents, being either displayed non-parallel or parallel with the first array of documents, groups documents from the first array of documents having the selected attribute in common. Some documents from the first array of documents associated with the selected attribute will therefore appear a second time on the second array of documents. Displaying many times the same documents on different arrays of documents might be confusing for a user.

Another deficiency becomes apparent when a user wants to infer the attribute(s), value or the status of a document just by seeing a document. A document can be associated with a color associated therewith, however, the information transmitted by a color is not enough to properly translate more complex status or value of a document.

The meaning of a color or a pattern associated with a document is arbitrary. It might be desirable to use a color and a pattern that are already known in a complete non-analogous field and use the color and the pattern with documents to reduce the effort required to understand the meaning inferred by colors and patterns associated with documents.

Another deficiency becomes apparent when attributes, or tags, are used to categorize documents according to subjects, topics, categories or other means for linking to documents additional related information or documents. Attributes are associated with documents to categorize the documents and create a link among documents sharing the same attribute. This could be called a first-degree relationship. Thus, attributes are used to retrieve documents associated therewith. So, by selecting an attribute it is possible to retrieve the documents having the selected attribute associated therewith.

In certain circumstances it could be useful to draw a link between two documents, inter alia, that don't share a common attribute. It is therefore desirable to have a way to connect one document to another document despite they are not sharing any common attributes.

Another deficiency becomes apparent when multiple attributes are associated with documents. It can easily become time consuming to individually associate a plurality of attributes with documents.

One other deficiency becomes apparent when multiple attributes having substantially similar meaning are used. A query based on a specific attribute is unlikely to retrieve documents associated with another attribute despite the other attribute has a substantially similar meaning.

The prior art computer systems or computer interfaces have not provided solutions to deal with the aforementioned deficiencies and each of these deficiencies in the prior art yield a demand for an improved information managing system and method using an intuitive and natural way to visually present information as well as improved ways to manage associations between the documents.

SUMMARY OF THE INVENTION

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the objects and aspects disclosed in a simplified form, as an introduction to the more detailed description that is presented later.

The word "document" is used throughout the present specification to facilitate its readability. It is nonetheless not intended to restrict or limit the scope of the present specification to documents. The present specification is mainly directed to computer systems and provides improvements that are useable for managing documents, electronic documents, menu items, application windows and other user-selectable elements displayed on a user graphical interface. The applicant therefore reserves the rights to define claimed subject matters to, inter alia, the above identified elements that could be represented on a user-graphical interface.

The present specification refers to "arrays of documents" although arrays of documents can have various forms. In an embodiment the array of documents can have a substantially linear shape disposing documents along a timeline. In another possible embodiment the array can be a curved line along which documents are displayed. Alternatively, the array can dispose documents on a matrix having a plurality of columns and rows.

Methods of managing information and graphical user interfaces are carried on by computer-readable instructions that are enabled on a computer. Nowadays computers are used everywhere; they come in various shapes and devices. Computers are so popular, inter alia, because they transform into a variety of dedicated purpose computers depending on the instructions they use. De facto, a general purpose computer is of little help until it has dedicated useful instructions defining its functioning. Once it uses dedicated instructions defining its functions, the dedicated purpose computer is adapted to manage data, to transform graphical rendering of information, to exchange data, in other words the computer using dedicated instructions is material in the transformation of data, the management of the process of transformation and the graphical representation of the process of transformation and the result of the process of transformation for a user to appreciate and, possibly, act upon.

It is therefore one object of the present specification to improve at least one of the aforementioned deficiencies.

One object of the present specification provides an improved method for managing information on a computer system.

Another object of the present specification provides an improved user graphical user interface for managing information.

One other object of the present specification provides an improved computer system adapted to manage information.

An object of the present specification provides an improved graphical representation of documents that appears on more than one array of documents.

Another object of the present specification provides an improved graphical document representation capable of providing additional meaning associated therewith.

One other object of the present specification provides a method for drawing links between documents that don't commonly share an attribute.

It is one aspect of the specification to provide a discriminative visual feature to documents from a first array of documents that will also be displayed on the second array of documents when displaying the second array of documents.

An aspect of the present specification provides a discriminative visual feature for identifying which documents from a first array of documents will be copied on a second array of documents so that it becomes apparent for a user that the same document is displayed simultaneously more than one time to prevent confusion.

An aspect of the present specification provides a discriminative visual feature adapted to identify documents displayed on a first array of documents that will also be displayed on a second array of documents. The discriminative visual feature being enabled either 1) before the second array of documents is displayed, 2) at the same time the second array of documents is displayed or 3) after the second array of documents is displayed.

One aspect of the present specification provides a discriminative visual feature that is, individually or in combination, a document color, a document texture, a document frame, a document animation or a transition animation applied to the documents present on both the first array of document and the second array of documents.

Another aspect of the present specification provides an animation adapted to illustrate copying of documents into document copies to be displayed on other arrays of documents. The copying being preferably shown simultaneously when the additional arrays of documents are displayed.

It is one object of the present specification provides a plurality of pattern codes adapted to be associated with documents. Each of the pattern code has a meaning associated therewith allowing a viewer to infer the meaning associated with the pattern that is combined with a document.

An additional object of the specification provides a method to associate attributes with color codes and/or pattern codes adapted to be applied to documents.

One additional object of the present invention provides color codes and/or pattern codes that are adapted to be associated with attributes, an association of a specific arrangement of color codes and/or pattern codes being associated to more than a single attribute.

One aspect of the present specification provides a graphical pattern code providing attribute-related meaning to a document to which it is associated so that a viewer can infers the attribute associated therewith without reading the attributes when seeing the document.

Another aspect of the present specification provides color codes and pattern codes that are analogous to colors and patterns distinguishing values of poker chips (or token).

An aspect of the present specification provides document quantification associated with a color code and/or a pattern code that is analogous to poker chips values.

Another aspect of the present specification provides a set of color codes and/or a set of pattern codes associated with incremental values; each of the color codes and each of the pattern codes being adapted to be associated, individually or collectively, with documents to graphically illustrate the value of each document.

One aspect of the present specification provides an icon size, a thumbnail size and a document size representing one document over various strength of zoom; each of the icon size, the thumbnail size and the document size being adapted to illustrate a color code and/or a pattern code adapted to its respective size.

Another aspect of the present specification provides a color code and/or a pattern code associated with an attribute, the color code and/or the pattern code being adapted to be graphically associated with documents associated with the attribute in a way that an observer can infer which attribute is associated with a document without reading.

One other aspect of the present specification provides a color code and/or a pattern code adapted to use, inter alia, a main color, a secondary color, a main shape and a secondary shape in association with attributes that can be associated with documents.

An additional aspect of the specification provides a value associated with color codes and/or pattern codes applied to documents. Variations in colors or in patterns meaning variation in value.

One object of the invention is to group at least two attributes/values, used to categorize documents together, when the at least two attributes/values are considered to be analogous, to use the group of attributes/values in a search despite the at least two attributes/values are not selected by a user to perform the search.

An aspect of the present specification provides the ability to group a plurality of attributes/values having analogous meaning and to use one attribute/value from the group of attributes/values to generate a search that will also automatically consider the other attributes/values from the group of attributes/values in the search.

One aspect of the specification provides a method to associate a plurality of attributes/values together such that a single-attribute/value based search performed by a user also provides search results also having the remaining attributes/values of the plurality of attributes/values.

Another aspect of the specification provides a visual distinctive feature adapted to be associated with attributes/values that are in a group of associated attributes/values so that they are discriminated in a list of attributes/values.

One other aspect of the present invention provides sharing of group of attributes among users.

One object of the specification provides a group of attributes/values adapted to be offered to a user when a document in inserted in a database; the attributes/values can be deleted, modified and other attributes/values can be added to the document when the group of attributes/values is offered.

Another object of the specification is to reduce the time required to properly associate attributes/values to documents by providing a group of attributes/values instead of selecting each relevant attributes/value independently.

One other object of the specification provides at least one master attribute/value a group of attributes/values; the group of attributes/values being offered to the user when one of the at least one master attribute/value is selected to be associated with the a document.

An aspect of the specification provides a dialogue on a user graphical interface adapted to display a group of attributes/values potentially relevant to a document when the document is categorized.

Another aspect of the specification provides a mechanism in a computer system adapted to propose to a user groups of potentially relevant attributes/values to be associated with documents; the selected group of potentially relevant attributes/values proposed to a user being based on the selection of a master attribute.

One another aspect of the specification provides a plurality of master attributes in a same group of attributes/values, a selection of each of the master attributes enabling the display of a dialogue containing the group of attributes/values.

Another aspect of the specification provides access and/or sharing rights of each group of attributes.

One object of the specification provides a means for associating documents having no common attributes.

An aspect of the present specification provides attributes and bridge attributes (indirect attribute) associable with a document.

Another aspect of the specification provides an interface capable of displaying a document associated with attributes (direct attributes) and/or associated with bridge attributes (indirect attributes). The direct attributes categorizing the document, and the bridge attributes, not categorizing the document but categorizing another document, provide a bridge to the other document(s) from the document.

An aspect of the present specification provides a graphical association between a bridge attribute and a document.

One other aspect of the present specification provides a bridge between a document and a related document not sharing the same attributes.

Another aspect of the present specification provides instructions to a computer system to associate an attribute and a bridge attribute to a document.

Another aspect of the present specification provides instructions to a computer system to access a first document from a second document by selecting a bridge attribute associated with the first document and not categorizing the second document, the bridge attribute being an attribute categorizing the first document.

One other aspect of the present specification provides a non-transitory computer-readable storage medium for tangibly storing computer-readable code thereon suitable for execution by a computing apparatus, the computer-readable code, when executed, being adapted to implement a method for visually indicating on a display those documents that have been displayed a plurality of times on a plurality of axes of documents based on a matching value of an attribute, the method comprising, providing a first group of documents at least some of which associated with one or more attributes; displaying documents of the first group of documents along a first axis; receiving an input representing a selected attribute of one of the first group of documents that is associated with one or more attributes; displaying to a second axis documents of the first group of documents that has a value matching the value of the user-selected attribute; and displaying a visual distinctive feature for each displayed document in the first group of documents that is displayed along the second axis; whereby a user is able to visualize which documents displayed along the first axis are also displayed on the second axis for having a value matching the value of the selected attribute One aspect of the present specification provides a method for visually indicating on a display those documents that have been displayed on one axis of documents and on another axis of documents based on a matching value of an attribute, the method comprising: displaying a first group of documents in a first display area of a display such that the group of documents defines at least a portion of a first axis of documents; receiving an input representing an attribute associated with at least one of the document of the first group; and displaying to a second display area of the display documents of the first group of documents that have a value matching the value of the selected attribute, said displaying to a second display area resulting in the displayed documents defining a second axis of documents; wherein the method further comprises: displaying a visual distinctive feature with the displayed documents that are displayed on the second axis, and not displaying the visual distinctive feature with displayed documents on the first axis that are not displayed on the second axis; whereby a user is able to visualize which displayed documents along the first axis have been displayed on the second axis for having a value matching the value of the selected attribute.

Another aspect of the present invention provides an apparatus for implementing a user interface adapted to visually indicating on a display those documents that have been displayed on an axis of documents and to another axis of documents based on a matching value of a selected attribute, the apparatus comprising a memory module adapted to store thereon a plurality of documents; and a processing unit in communication with the memory module, the processing unit being operative for executing computer readable program code stored on a non-transient computer readable medium for implementing a method comprising displaying documents of the plurality of documents on a first axis of documents; receiving an input representing a selected attribute of at least one of the plurality of documents; displaying, to a second axis of documents, documents of the plurality of documents that have a value matching the value of the user-selected attribute; and displaying a visual distinctive feature associated with displayed documents on the first axis that are displayed on the second axis, and not displaying the visual distinctive feature with displayed documents on the first axis that are not displayed to the second axis; and whereby a user is able to visualize which documents along the first axis have been displayed on the second axis for having a value matching the value of the user-selected attribute.

These and other advantages and features of the present invention will become apparent from the following description and the attached drawings.

BRIEF DESCRIPTION OF THE DRAWINGS

FIG. 6 illustrates an exemplary poker token;

FIG. 7 illustrates an exemplary icon representing a document with color-coding thereon;

FIG. 8 illustrates an exemplary thumbnail representing a document with color-coding thereon;

FIG. 9 illustrates an exemplary document with color-coding thereon;

FIG. 23 illustrates a list of attributes;

FIG. 24 illustrates two documents with one respective attribute associated therewith;

FIG. 25 illustrates two documents of FIG. 23 with bridge attribute E associated with document (1);

FIG. 26 illustrates a plurality of documents with respective attributes associated therewith;

DESCRIPTION OF EMBODIMENT(S) OF THE INVENTION

The present invention is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, well-known structures and devices are shown in block diagram form in order to facilitate describing the present invention.

The features provided in this specification mainly, but might not exclusively, relate to principles of computer software and machine-readable code/instructions adapted to instruct a computer, many computers or other machines adapted to use the instructions to provide material effects on a display, or other means enabling human-computer interactions to manage documents, menus, user-selectable elements and other computer files. These code/instructions are preferably stored on a machine-readable medium to be read and acted upon to with a computer or a machine having the appropriate code/instructions reading capability.

Exemplary Network

Figure 1:
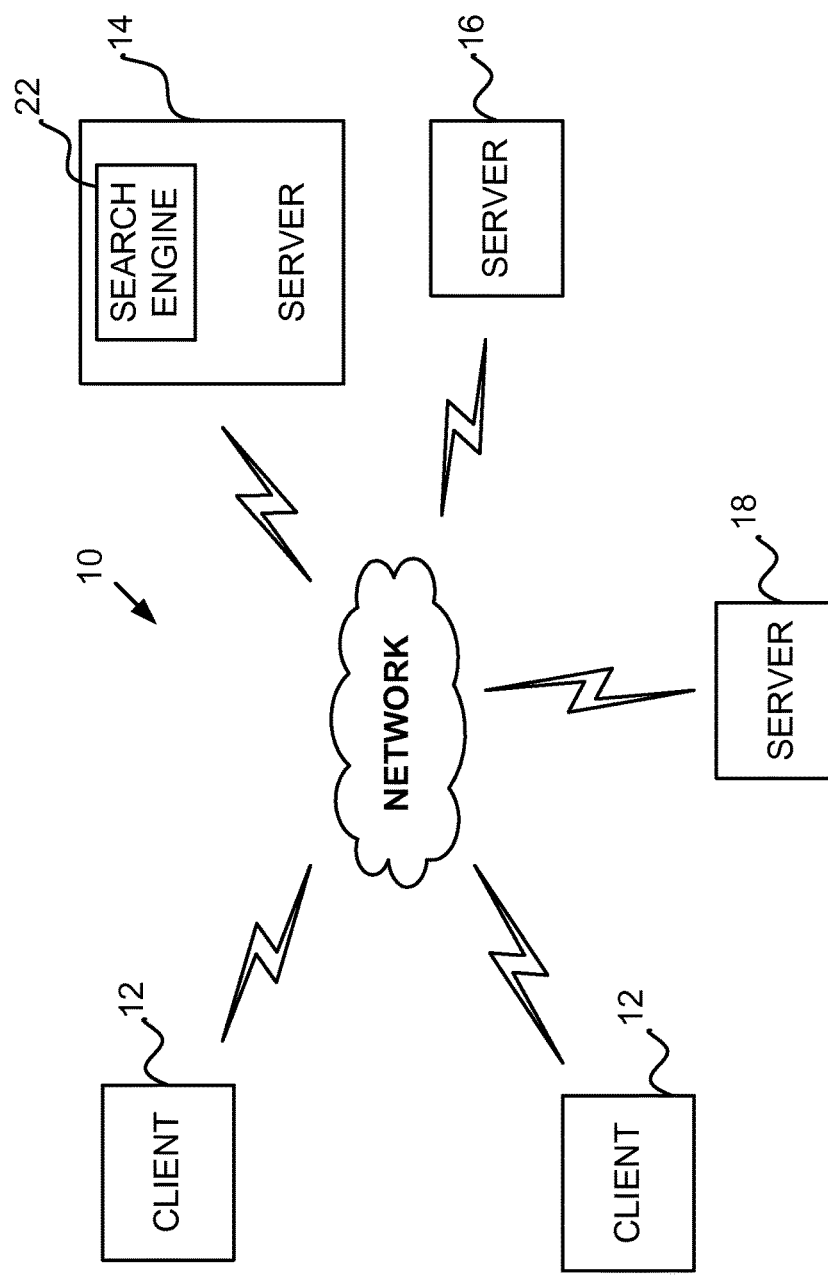
FIG. 1 illustrates a block diagram of an exemplary computer network.

FIG. 1 illustrates an exemplary network 10 in which a system and a method, consistent with the present invention, may be implemented. The network 10 may include multiple client devices 12 connected to multiple servers 14, 16, 18 via a network 20. The network 20 may include a local area network (LAN), a wide area network (WAN), a phone network, such as the Public Switched Phone Network (PSTN), an intranet, the Internet, Wi-Fi, WiMAX or a combination of networks. Two client devices 12 and three servers 14, 16, 18 have been illustrated as connected to network 20 for simplicity. In practice, there may be more or less client devices and servers 14, 16, 18. Also, in some instances, a client 12 device may perform the functions of a server 14, 16, 18 and a server 14, 16, 18 may perform the functions of a client 12 device.

The client devices 12 may include devices, such as mainframes, minicomputers, personal computers, laptops, personal digital assistants, phones, or the like, capable of connecting to the network 20. The client devices 12 may transmit data over the network 20 or receive data from the network 20 via a wired, wireless, or optical connection.

The servers 14, 16, 18 may include one or more types of computer system, such as a mainframe, minicomputer, or personal computer, capable of connecting to the network 20 to enable servers 14, 16, 18 to communicate with the client devices 12. In alternative implementations, the servers 14, 16, 18 may include mechanisms for directly connecting to one or more client devices 12. The servers 14, 16, 18 may transmit data over the network 20 or receive data from the network 20 via a wired, wireless, or optical connection.

In an implementation consistent with the present invention illustratively embodied herein, the server 14 may include a search engine 22 usable by the client devices 12. The servers 14, 16, 18 may store documents, such as web pages, accessible by the client devices 12.

Figure 2:
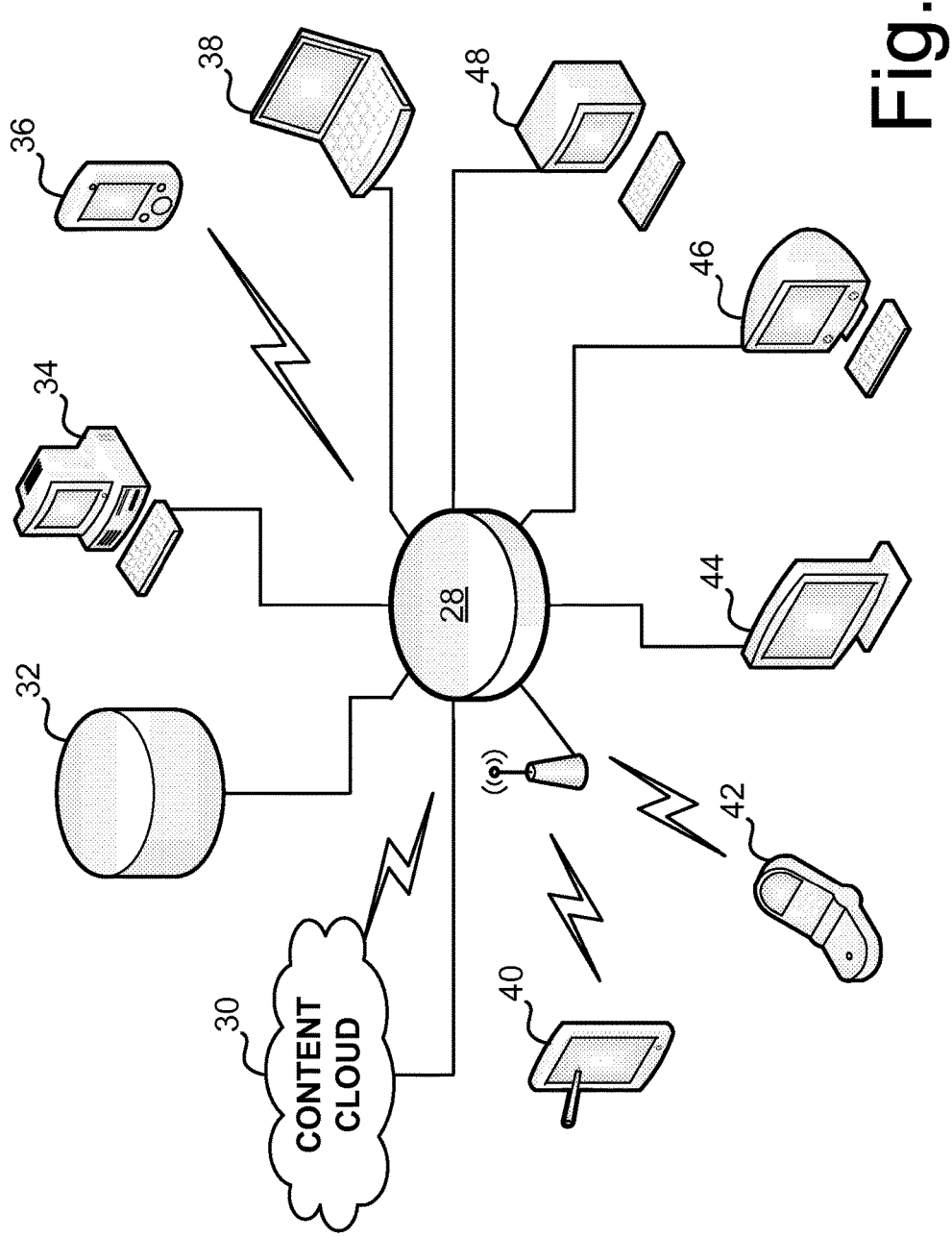
FIG. 2 illustrates a block diagram of an exemplary computer network.

With reference to FIG. 2, a network 20 includes the content cloud 30, a content database 32, content devices 34-38, and other devices 40-48. The network mediator 28 enables network devices 32-48 to communicate with each other without pre-configuring each device. The content cloud 30 represent a content source such as the Internet, where content exists at various locations across the globe that could be reached through a wired connection and/or with a wireless connection. The content includes multimedia content such as audio and video. The mediator 28 allows the content cloud to provide content to devices 34-48. The content database 32 is a storage device that maintains content. The content database 32 may be a stand-alone device on an external communication network. The mediator 28 communicates with the content database 32 to access and retrieve content. The content devices 34-48 include intelligent devices, such as, for example, personal computers, laptops, cell phones and personal digital assistants. The content devices 34-48 are capable or storing content data. The devices 34-48 are intelligent devices that receive content from other content devices 30-48. However, the devices 30-48 can also operate as servers to distribute content to other client devices.

Exemplary Client Architecture

The following discussion provides a brief, general description of an exemplary computer apparatus in which at least some aspects of the present invention may be implemented. The present invention will be described in the general context of computer-executable instructions, such as program modules, being executed by a computerized device. However, the methods of the present invention may be affected by other apparatus. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor system, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network as exemplified in FIG. 2. In a distributed computing environment, program modules may be located in local and/or remote memory storage devices.

Figure 3:
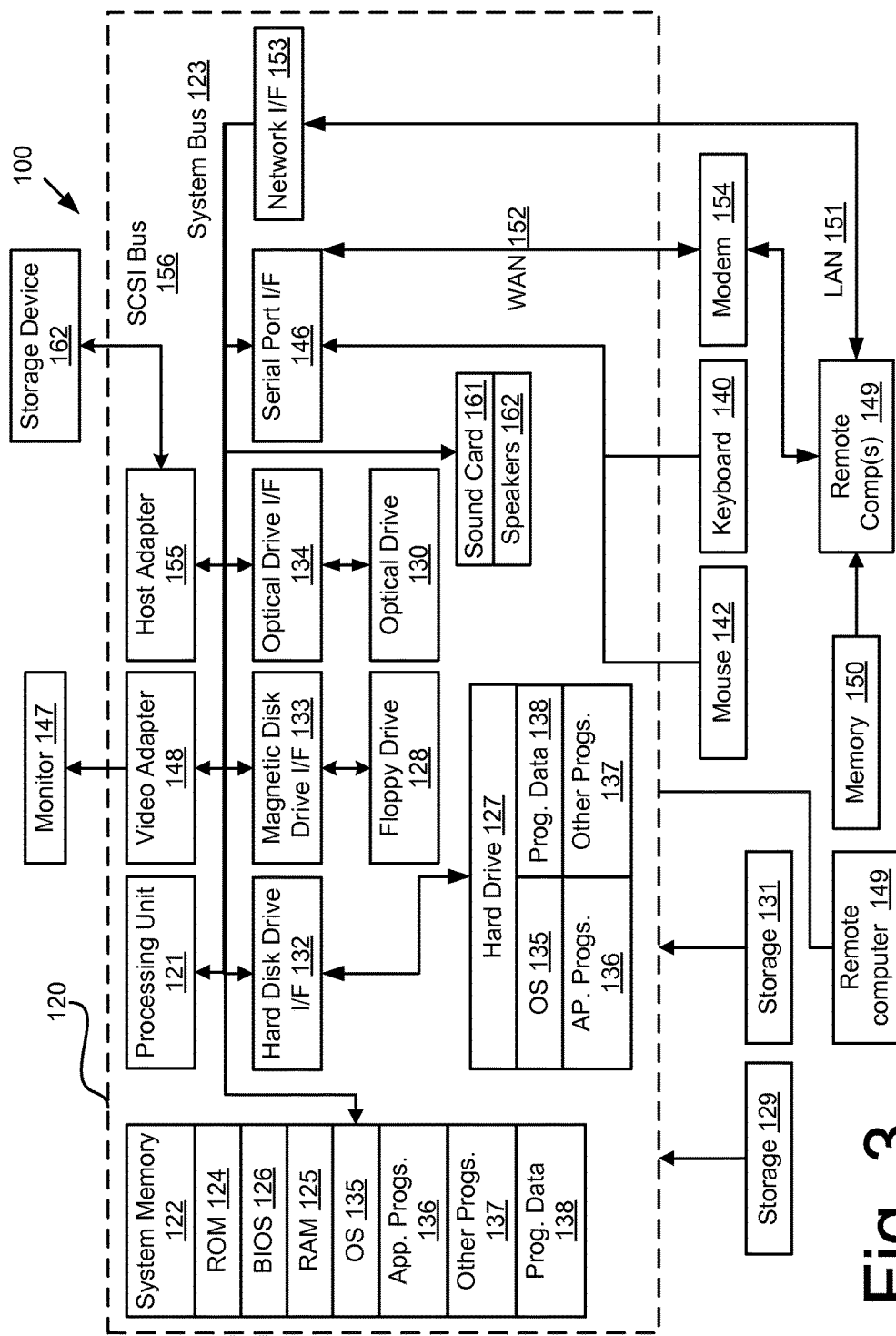
FIG. 3 illustrates a block diagram of an exemplary computer system.

With reference to FIG. 3, an exemplary apparatus 100 for implementing at least some aspects of the present invention includes a general purpose computing device in the form of a computer 120 or in the form of a computerized portable apparatus. The computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer data between elements within the computer 120, such as during start-up, may be stored in ROM 124. The computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile (or persistent) storage of machine-readable instructions, data structures, program modules and other data for the computer 120. Although the exemplary environment described herein employs a hard disk, a removable magnetic disk 129 and a removable optical disk 131, these skilled in the art will appreciate that other types of storage media, such as magnetic cassettes, flash memory cards, digital video disks, Bernoulli cartridges, random access memories (RAMs), read only memories (ROM), remote cloud storage and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and data into the computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the computer 120 may include other peripheral output devices (not shown), such as a printer, a hi-definition television and a scanner for example. As an alternative or an addition to the video monitor 147, a stereo video output device, such as a head mounted display or LCD shutter glasses for example, could be used.

The computer 120 may operate in a networked environment which defines logical connections to one or more remote computers, such as a remote computer 149. The remote computer 149 may be another computer, a server, a router, a network PC, a peer device or other common network node, and may include many or all of the elements described above relative to the computer 120. The logical connections depicted in FIG. 3 include a local area network (LAN) 151 and a wide area network (WAN) 152, an intranet and the Internet.

When used in a LAN, the computer 120 may be connected to the LAN 151 through a network interface adapter (or "NIC") 153. When used in a WAN, such as the Internet, the computer 120 may include a modem 154 or other means for establishing communications over the wide area network 152 (e.g. Wi-Fi, WinMax). The modem 154, which may be internal or external, may be connected to the system bus 123 via the serial port interface 146 or another type of port interface. In a networked environment, at least some of the program modules depicted relative to the computer 120 may be stored in the remote memory storage device. The network connections shown are exemplary and other means of establishing a communications link between the computers may be used.

Visual Document Attribute Discrimination

Figure 4:
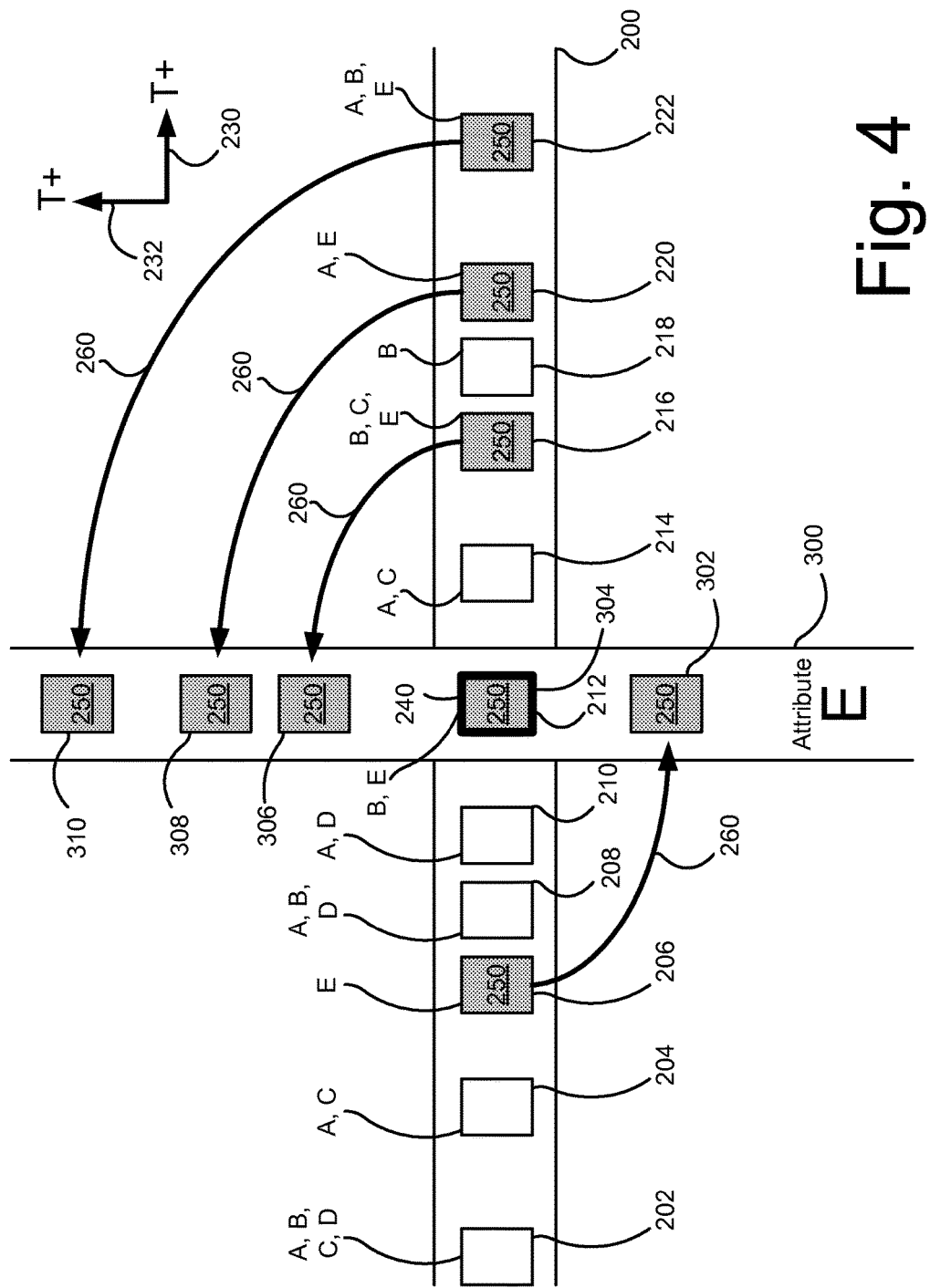
FIG. 4 illustrates a schematic exemplary embodiment of non-parallel arrays of documents with emphasis added on repeating documents thereon.

Referring to FIG. 4, is illustrated a first array of documents 200 comprising a group of documents 202, 204, 206, 208, 210, 212, 214, 216, 218, 220, 222 disposed along a chronological order 230 on a graphical user interface adapted to manage documents.

Each document is associated with related attributes or tags, or keywords. In the present embodiment, each attribute is illustratively represented with a capital letter A, B, C, D or E. An attribute is selected, most likely by a user, from all the attributes associated with at least one of the documents present on the first array of documents 200. For instance, attribute E is selected. Documents 206, 212, 216, 220, 222 are illustratively associated with the selected attribute (i.e. attribute E). The document from which attribute E is selected acts as intersecting document. Alternatively, another document could be used as intersecting document although it makes sense to use the document from which the attribute has been selected.

Thus, attribute E is selected and document 212 is the intersecting document intervening between both arrays of documents 200, 300. The intersecting document 212 is located at the intersection of both arrays of documents 200, 300 to graphically put emphasis on the relationship between both arrays of documents 200, 300. A bold frame 240 or other visually discriminating element, optionally, illustrates that the selected attribute has been selected from this particular document 212.

The second array of documents 300 is created, simultaneously or consecutively with the display of the first array of documents 200, showing the documents from the first array of documents 200 that have the selected attribute E associated therewith. In other words, documents 206, 212, 216, 220 and 222 are search results obtained with the query "attribute E" disposed on the second document array 300 along the chronological order 232. As it can be appreciated, documents 206, 212, 216, 220 and 222 are copied on both arrays of documents 200, 300 where document 206 is copied and shown as document 302, document 212 is copied as document 304 (the same document used as intersecting document 212 therefore used a single time by both arrays of documents 200, 300), document 216 is document 306, document 220 is document 308 and document 222 is document 310.

Since documents 206, 216, 220, 222 are copied on both arrays of documents 200, 300 it could be confusing for a user to see the same documents 206, 216, 220 and 222 displayed at two different places, e.g. displayed on both array of documents 200 and array of documents 300. Or, it could be useful to a user to see where is copied a document of interest.

In order to identify and discriminate the documents on the first document array 200 that will be found on the second array of documents 300, a discrimination visual feature 250 is applied to the documents 206, 212, 216, 220, 222 and similarly applied to the documents 302, 304, 306, 308, 310 displayed on the second array of documents 300. In the present situation the illustrative discriminative visual feature darkens 250 the relevant documents as shown on FIG. 4. The discriminative visual feature 250 assists an observer, or a user of the system, to infer which documents from the first array of documents 200 will also appear on the second array of documents 300 and where it will appear so that a quick relation can be established between the duplicated documents 206, 216, 220 and 222. Document 212 is a special case and is darken 250 for a reason of consistency despite it is not duplicated for obvious reasons.

It might be desirable that the discriminating visual feature 250 be applied (or enabled) to the documents having the attribute E associated therewith on the first array of documents 200, then, display the second array of documents 300 with the duplicated documents 206, 216, 220 and 222. Then, enable the discriminating visual feature to be displayed with documents 302, 304, 306, 308, 310 on the second array of documents 300.

The discriminating visual feature 250 can appear for a limited lapse of time at the moment the second array of documents 300 is displayed so that an observer, or a user, could see which documents from the first array of documents 200 will also appear on the second array of documents 300. The discriminating visual feature 250 will disappear after a pre-selected delay is expired. Conversely, discriminating visual features 250, such as a document color, a document frame and a document texture applied to the documents to be duplicated, can remain associated with the subject documents as long as the second array of documents 300 is displayed. Conversely, the discriminating visual features 250 can remain visible for a predetermined amount of time and then disappear.

The discriminating visual feature 250 could be a color applied to the documents, a border around the documents, animations, an alteration of a portion of the documents, an animation showing a movement 260 of each documents having the E attribute from the first array of documents 200 to their respective position on the second array of documents 300. The display of the discriminating visual feature 250 can be made with an animation 260 literally moving, or copying, documents 206, 216, 220, 222 from the first array of documents 200 to their respective locations on the second array of documents 300.

Any visual means capable of discriminating the documents from a user point of view so that the user can see which documents from the first array of documents 200 will be, or is, duplicated on the second array of documents 300 is encompassed by the present specification. Also, more than two arrays of documents can be involved into the use of the discriminating visual features.

Figure 5:
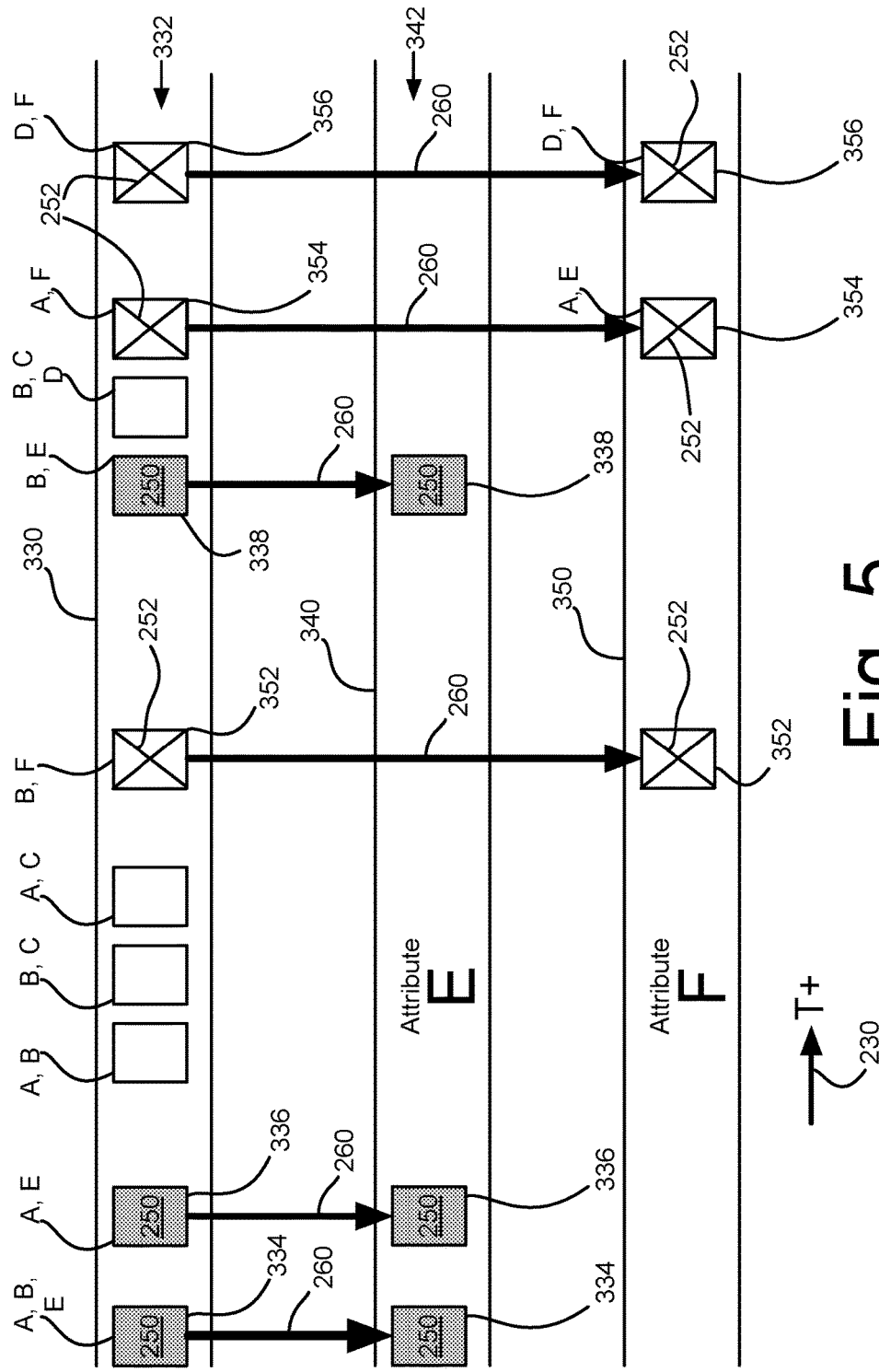
FIG. 5 illustrates a schematic exemplary embodiment of substantially parallel arrays of documents with emphasis added on repeating documents thereon.

Referring now to FIG. 5 where are provided three parallel arrays of documents 330, 340, 350. The first array of documents 330 displays a group of documents 332 having a respective selection of attributes A, B, C, D, E and F associated therewith. Attribute E, in relation with all attributes associated with the first array of documents 330 or in relation with a particular document from the first array of documents 330 or from a list of attributes is selected and leads to the creation of array of documents 340 displaying only documents having the attribute E. The discriminating visual feature 250 is applied so that an observer, or a user, would see which documents from the first array of documents 330 are associated with the attribute E and are to be duplicated on the second array of documents 340 when the attribute E is selected and the second array of documents 340, displaying only the documents 334, 336, 338 associated with the attribute E, is created and displayed. As explained above, but this time in respect to substantially parallel arrays of documents, this application of discriminating visual feature 250 helps preventing any confusion occurring with the duplication of a number of documents. The second array of documents 340, thus, displays a group of documents 342 having the attribute E in common.

The same principle is applied to the third array of documents 350 that displays a group of documents 352, 354, 356 having the attribute F in common. A logic similar to the logic described in respect with attribute E applies here where a discriminating visual feature 252 put a X on the documents having the attribute F that will be duplicated on the third array of documents 350 grouping the documents having the attribute F in common. Similarly discriminating visual feature 252 marks the documents having the attribute F that are displayed on the third array of documents 350 grouping the documents having the attribute F in common.

Here again, the application of the discriminating visual feature 352 can be made with an animation 260 clearly moving, or copying, documents 352, 354, 356 from the first array of documents 330 to their respective locations on the third array of documents 352.

The illustrative embodiments presented herein are presenting three arrays of documents 330, 340, 350. However, the present specification does not intend to limit the number of arrays displayed consecutively or simultaneously.

Document Color Coding

As mentioned above, discriminative visual features 250, 252 are useful to distinguish documents from other documents that do not share some specific attribute, or tag, or key word.

Documents can be reduced and magnified in size according to the number of documents desired to be seen at one time on a display. When the document is too small to appreciate its details it is convenient to use colors, shapes and patterns associated to different meanings, attributes and/or tags so that a viewer can infer the associated meaning without having to magnify the document. More than one attribute can be represented by an arrangement of shape and colors. Various colors, shapes and patterns could be used and the scope of the present application does not intend to limit their possible variations.

It is desirable be inspired by color and pattern coding associated with something already well known in a non-analogous field to represent one attribute of a combination of attributes. One possible option is to see what is done in the field of poker where colors and patterns are used to distinguish the chips used in the game as opposed to real money. The colors and patterns are intended to be easily recognizable a chip's value when the chip is seen from its face and from its side without reading the actual writing on it.

Typically colors found in home sets of poker chips include red, white, blue and sometimes black; however, more recently a wide assortment of colors has become readily available.

$2.50 chips are almost exclusively used for blackjack tables, since a "natural" (a 21 on the first two cards dealt to a player) typically pays 3:2 and most wagers are in increments of $5. However, the Tropicana Casino in Atlantic City, N.J. has used pink chips in $7.50-$15 and $10-$20 poker games. Low-denomination yellow chips can vary in value: $20 by statute in Atlantic City and Illinois (which also uses "mustard yellow" $0.50 chips); $5 at most Southern California poker rooms; $2 at Foxwoods' poker room in Ledyard, Conn. and at Casino del Sol in Tucson, Ariz.; and $0.50 at Potawatomi Casino in Milwaukee, Wis. Blue chips are occasionally used for $10, most notably by statute in Atlantic City. In Las Vegas and California, most casinos use blue or white for $1 chips, though many Vegas tables now use $1 metal tokens in lieu of chips. Many casinos have coinless slot machines, and this practice reduces costs by limiting $1 chips to the craps tables, where such chips are necessary.

Chips are commonly available in $1000 denominations, depending on the wagering limits of the casino in question. Such chips are often yellow or orange and of a large size. Las Vegas, Atlantic City, and other areas, which permit high wagers typically, have chips available in $5,000, $10,000, $25,000, and higher denominations; the colors for these vary widely.

European casinos use a similar scheme, though certain venues (such as Aviation Club de France) use pink for €2 and blue for €10. European casinos also use plaques rather than chips for high denominations (usually in the €1000 and higher range).

In many places, gaming boards regulate the color and size of casino chips for consistency. All states require that casino chips have a unique combination of edge (e.g. side) spots for identification, the name and location of the casino and the chip's value, if any, impressed, printed, or molded onto the obverse and reverse of the token. Notably, Nevada has no regulations on color; this is why Nevada casinos may use white, blue, or gray as $1, though $5 and higher are almost always consistently colored.

Referring to FIG. 6, the color and shape used on poker chips 400 are distinguishable when the chip is seen from its face 402 and from its side 404.

A possible standard, for example, could use the following color-coding scheme illustrated in Table 1.

TABLE 1

Poker chips 400 colors 406, 408 and shape 412 values

| Denomination | Main color 406 | Secondary color 408 and secondary shape 412 |
|---|---|---|
| $0.50 | Dark yellow | None |
| $1 | White | None |
| $2.50 | Pink | Round black |
| $5 | Red | Square yellow |
| $10 | Blue | Round white |
| $20 | Bright yellow | Square black |
| $25 | Green | Round yellow |
| $100 | Black | Square white |
| $500 | Purple | Rectangle white |
| $1000 | Fire orange | Lozenge black |
| $5000 | Gray | Triangle red |

The denomination is the actual value of the chip 400. The main color 406 is used on a portion of the circumference of the chip 400 so that is can be consistently appreciated when seen from the face 402 and from the edge/side 404. FIG. 6 is depicting a possible main color 406 and main shape 410 but other shapes/patterns are considered within the scope of the present specification. The secondary color 408 appears in a secondary shape 412 consistently visible from the face view 402 and from the side view 404 in a contrasting color portion 414 (in the present example it is black). In the present example the secondary shape is a circle but it could be any other recognizable shape, e.g. square, triangle, oval, hexagon, diamond, spade, heart, skull, flag, clubs or a letter/number.

The application of a color and pattern code on documents could be defined as follow in Table 2 for illustrative purpose.

TABLE 2

Documents color codes and meaning

| Main color 424 | Importance | Secondary color 426 | Delay | Secondary shape 430 | Document type |
|---|---|---|---|---|---|
| Green | Low | Green | Prospective | Square | Email |
| Orange | Medium | Orange | In time | Circle | Text |
| Red | High | Red | Urgent | Rectangle | Webpage |
| | | | | Heart | Picture |
| | | | | Lozenge | Not assigned yet |
| | | | | Triangle | Not assigned yet |

Referring to FIG. 7 is shown an icon 422 representing a document 420. The icon 422 is a small representation of a document 420 used when the document would be shown too small for perceiving the details of the actual document 420. For this reason the color and pattern coding take illustratively all the area on the icon 422. The main color 424 is illustratively disposed on the periphery of the icon 422 while the secondary color 426 is displayed in cooperation with the secondary shape 430. Again, the secondary color 426 and secondary shape 430 are disposed in a contrasting portion 432.

Still on FIG. 7, for example, if the main color 424 is illustratively orange, the secondary color 426 is illustratively orange and the secondary shape 430 is illustratively round. According to Table 2, the attributes associated with the main color 424, the secondary color 426 and the secondary shape 430 of document 420 infer that it is a "text document" that is of "medium importance" and dealt with "in time". This way, with a simple look over documents, it is possible to retrieve the "urgent documents" 420 by finding the documents having a secondary color 426 that is "red".

FIG. 8 illustrates the same document in a thumbnail size 438 where it is possible to see the text document in much smaller size than the actual real life document size 440. The colors 424, 426 and the shape 430 are illustratively identified on the bottom of the thumbnail document 438 to limit the interference with the visible portion of the document 420.

FIG. 9 illustrates the actual document 420 in a real life size 440, or magnified size, so that it is possible to read the text of the document. In this case the colors 424, 426 and the shape 430 are applied on the circumference of the document 420 not to hide the document 420 itself.

Shapes and colors can be shared among users. The actual layout of the main color 420, the secondary color 426 and the secondary shape 430 on the document 420 are for illustrative purpose and could be changed while keeping the same spirit and without departing from the present specification.

Associated Attributes

As identified above, attributes, tags or key words are used to categorize and discriminate documents. The use of several attributes is desirable to properly classify documents with as many different attributes as necessary. This is probably workable without too much difficulty if there is a single user classifying its own documents with its own set of attributes, although it might not. When documents are exchanged among a plurality of users it becomes more difficult to keep a clear list of attributes since a user has to consider the attributes created by other users.

One possible issue arises when doing a search among documents. For instance, two (or more) attributes from different users (or perhaps a single user) can substantially share the same meaning. If only one attribute is selected to build the search query only the documents associated with this particular attribute will be presented as results. In other words all relevant documents associated to like attributes in meaning (but literally different attributes) will not be retrieved despite they could be relevant.

A way to fix this would be to change attributes on documents provided or shared by others. One can imagine that this process would be painful and time consuming. Realistically it would not be possible to do such an up-date to documents. Even if this was possible it would risk to created such a mess with shared documents that would then appear to have different attributes for each user.

An embodiment of the present specification provides associated attributes. An associated attribute is, like it says, associated with another attribute so that when an attribute is selected the associated attribute is considered as well.

Figure 10:
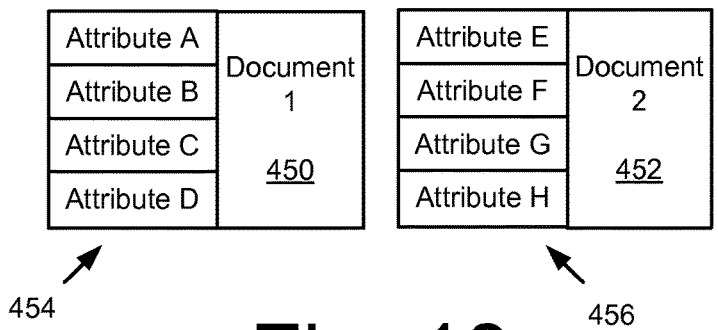
FIG. 10 illustrates an exemplary block diagram of documents with attributes associated therewith.
Figure 11:
FIG. 11 illustrates an exemplary of associated attributes.

Two documents (1), (2), 450, 452 are illustrated on FIG. 10 with respective associated attributes 454, 456. For example, if attribute A is selected to retrieved documents associated therewith, only document 1 would be retrieved as a result. There is no similar attribute with document 2 that is shared by another user because the document (2) 452 is categorized with the other user's attributes. The search would fail to provide all relevant results if attribute A of our user is equivalent in sense to attribute G of the other user's attribute. Therefore, the present embodiment provides a way to associate attribute A with attribute G as illustrated in FIG. 11.

Figure 12:
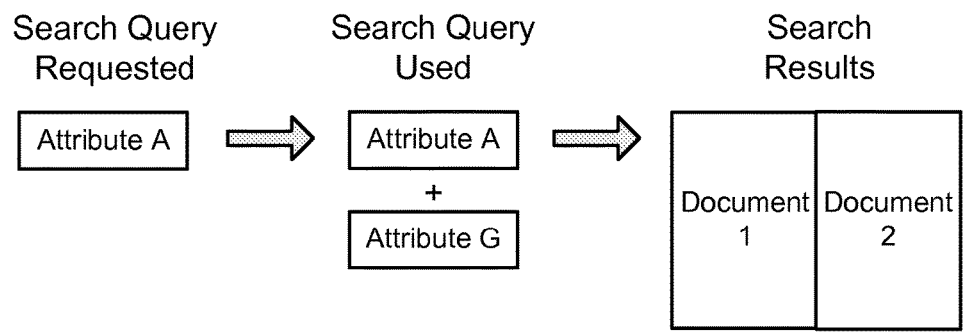
FIG. 12 illustrates an exemplary query using associated attributes, despite a single attribute has been selected, to build the query and provide results.

FIG. 12 shows what happens with an attribute based search query if attribute A is associated with attribute G: both document 1 and document 2 are retrieved and presented in the results.

In the latter illustrative example, the logical operator used between attribute A and attribute G is logical operator (AND). Other logical operators could be used between associated attributes. One example could be to associate attribute A with attribute G with the logical operator (NOT) to exclude documents having both attribute A and G from the search results by keeping only documents associated with attribute A in combination with other attributes but attribute G.

To achieve this a correspondence table (not shown) could be used where a user indicates which attribute is associated with which other attribute(s). The attributes could be attributes of a single user or be attributes shared by other users. The attributes shared by other users could be shared by sharing the actual attribute(s) or by sharing documents having the attribute(s) associated therewith. In the latter situation the attribute(s) might not be usable by the user if the other user has granted no such access right.

Associated attributes can evolve over time. At first, two attributes can be associated together and later a third attribute can be associated thereto. The evolution of each "package" of associated attribute can be illustrated over a timeline showing when each additional attribute has been added to the "package" and when attributes have been removed from the "package" of attributes. It is desirable to keep track of the time of entry and the time of extraction of each attribute in a "package" of attributes to properly define a query targeting a specific time period.

Grouped Attributes

It can rapidly become time consuming to individually associate many attributes with a document (or a plurality of documents at the same time). In order to facilitate the process of associating attributes to documents it is provided herein to group attributes that are likely to be used together when associating attributes to document(s). In turn, many different groups of attributes can be created and retrieved when desired.

Figure 13:
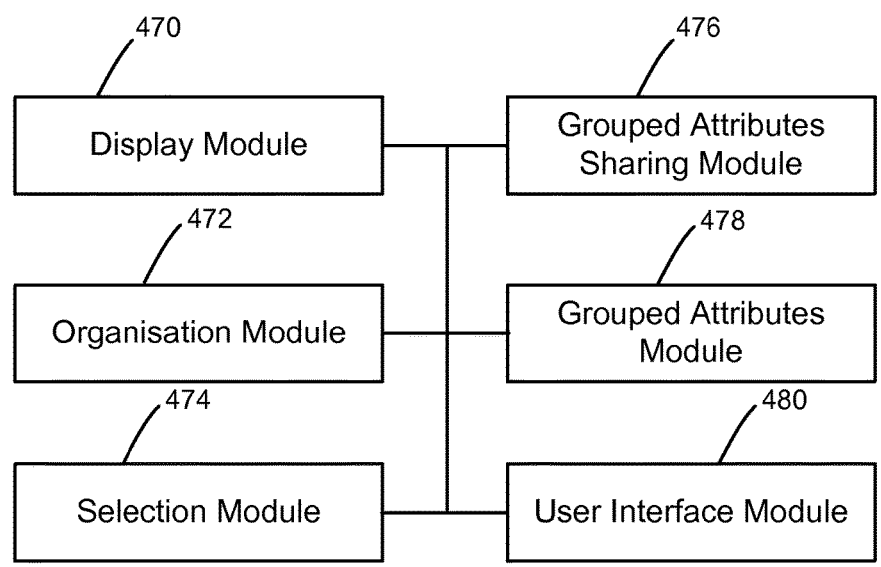
FIG. 13 illustrates an exemplary block diagram of a module-based system adapted to manage and use grouped attributes.

FIG. 13 illustrates a block diagram of a system capable of providing such mechanism. A display module 470 is provided to display documents and attributes; an organization module 472 adapted to organize documents with related attributes; a selection module 474 is adapted to select attributes and documents by a user; a group sharing module 476 adapted to share groups of attributes among users; a grouped attributes module 478 adapted to manage groups of attributes and a user interface module 480 adapted to provide user interaction based, at least in part, on a graphical display of user-selectable elements adapted to offer choices to a user in order to establish a dialogue with the user.

Figure 14:
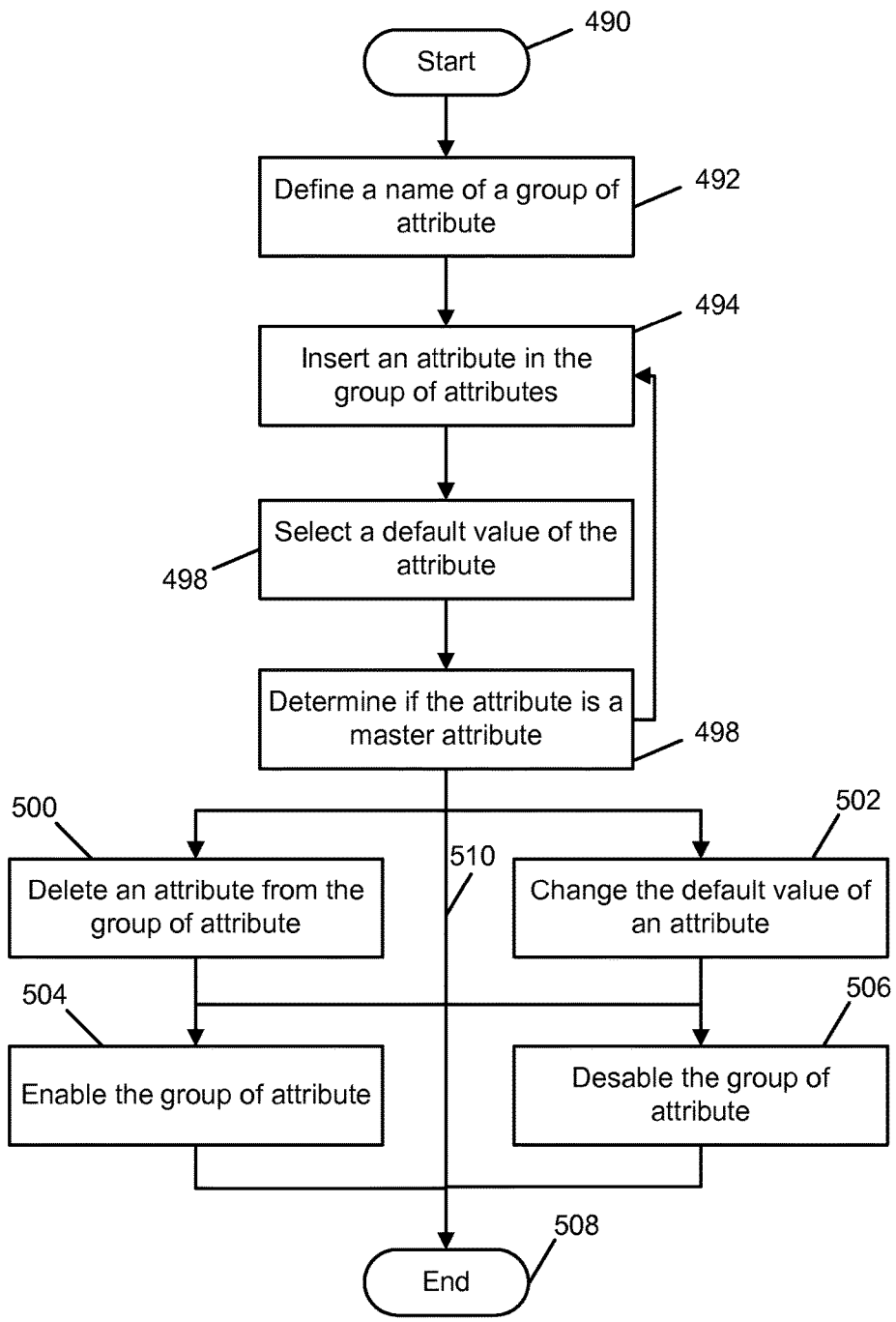
FIG. 14 illustrates an exemplary flow chart of steps performed during the creation of a group of attributes.
Figure 15:
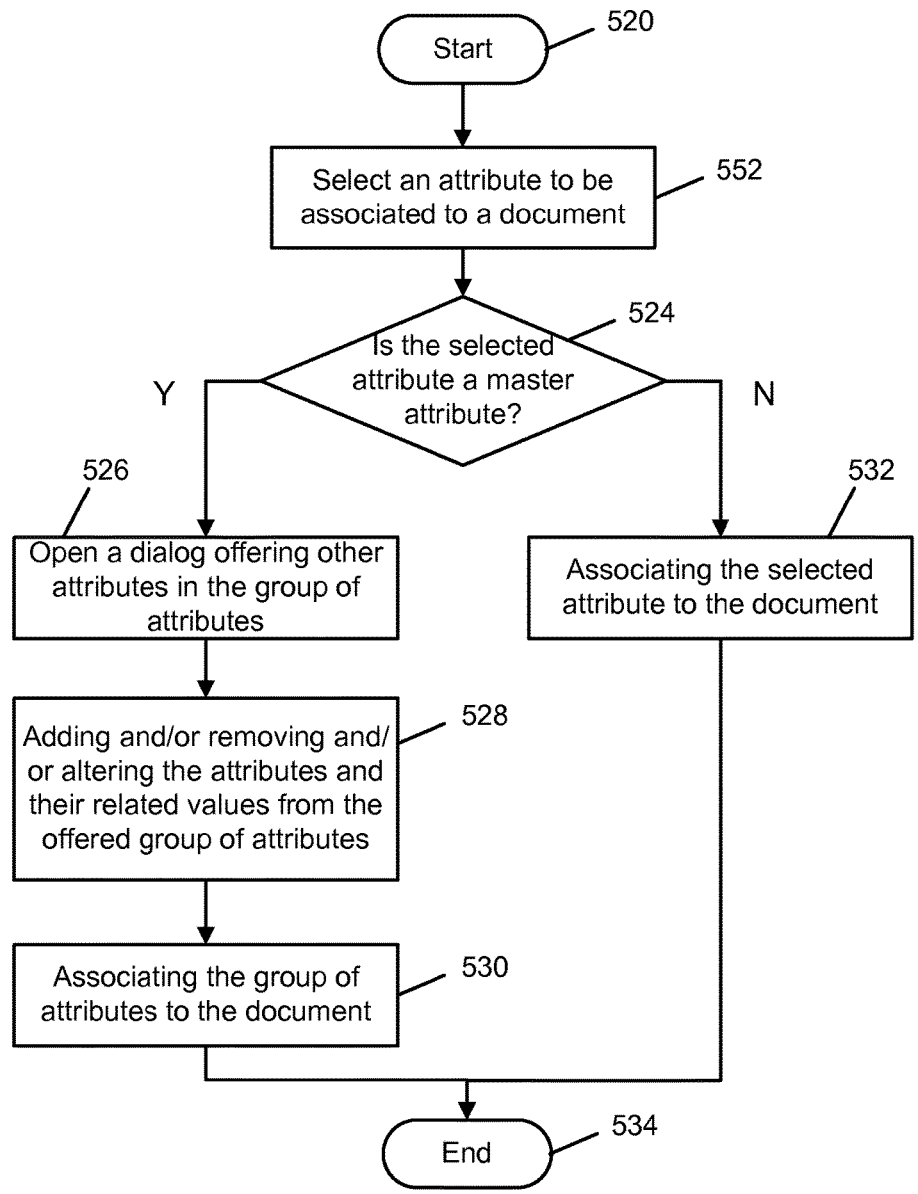
FIG. 15 illustrates an exemplary flow chart of steps performed during the association of attributes from a group of attributes with a document(s)

Turning now to FIG. 14 illustrating an exemplary flow chart of a possible sequence of actions leading to the use of groups of attributes. The sequence starts 490 with defining a name of a subject group of attributes 492 (to be created) and inserting an attribute 494 in the group of attributes with a predetermined selected default value associated with the attribute 496 (an alternative would provide an attribute with no value although the present embodiment uses a more refined attribute/value system thus requiring to select a default value to the attribute). It is determined if the attribute is a "master attribute" or not a master attribute 498. A master attribute is an attribute that, when selected in the course of associating attributes with document(s), will call the other attributes of the group of attributes to the dialogue presented to the user. The user can decide which attribute(s) from the group of attributes, and desired value associated therewith, when applicable, will be associated with the document(s). Each attribute in a group of attributes can be designed as a "master attribute". This way, the selection of any of the "master attributes" of a group of attributes will call the other attributes from the group of attributes in the dialogue allowing association of attributes with document(s). Steps 494, 496 and 498 are repeated for each attribute in the group of attributes. Several choices are offered to the user managing the group of attributes. Still in FIG. 14, undesired attributes can simply be removed (or deleted) 500 from the group of attributes, other attributes that are not already part of the group of attributes can alternatively be added as previously discussed. The default value of each attribute can be changed 502. Finally, the group of attributes can either be enabled 504 or disabled 506 depending of the pertinence of the group before the illustrative process ends 508.

Figure 18:
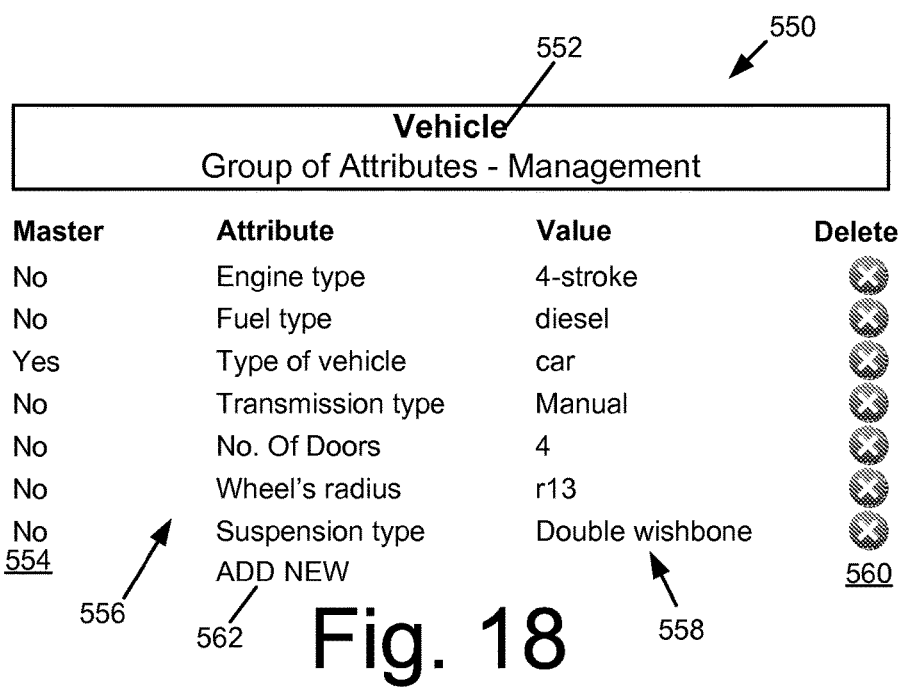
FIG. 18 illustrates an exemplary dialogue adapted to allow the management of a group of attributes.

Turning now to FIG. 18 illustrating an exemplary process for associating attribute(s) to document(s). The process begins 520 with the selection of an attribute 522 intended to be associated with the document(s). If the selected attribute is a "master attribute" a dialog opens 526 to offer the other attributes from the group of attributes that includes the selected "master attribute". It is possible to modify the attributes forming the group of attributes by adding, removing or altering the attributes/values of the group of attributes 528. The attributes are associated to the document(s) 530 when the adjustment(s), if needed, on the proposed group of attributes are done. Alternatively, if the selected attribute 522 is not a master attribute 524 then, the selected attribute can be associated with the document(s) 532 without offering a group of attributes before the process ends 534.

Other attributes forming another group of attributes are added in the dialog when another master attribute is selected. Redundant attributes will be automatically removed from the dialog. Many attributes, master attribute(s) or not, can be added in the dialog to properly categorize the subject document(s).

Figures 16, 17:
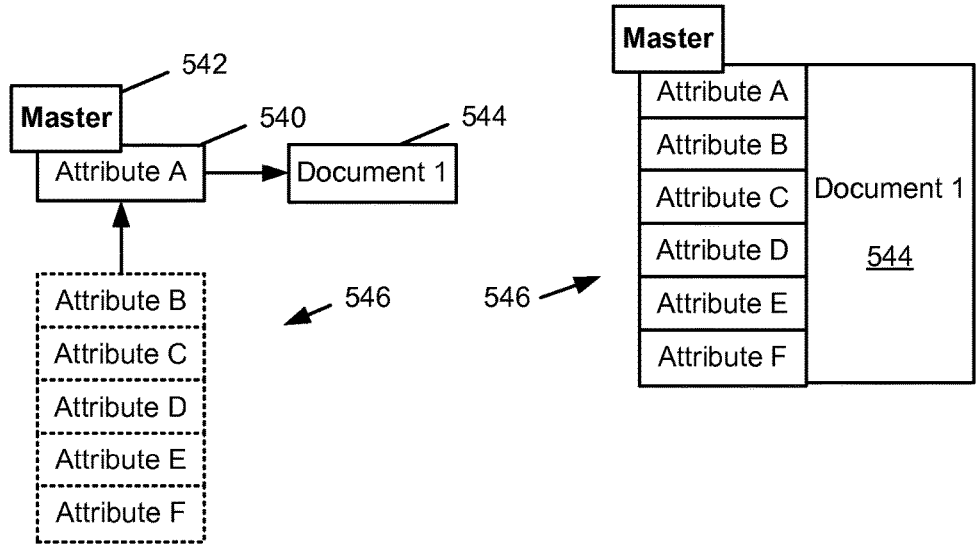
FIG. 16 illustrates an exemplary block diagram of a master attribute adapted to associate its related group of attributes with a document.
FIG. 17 illustrates an exemplary block diagram of a plurality of attributes from a group of attributes associated with a document.

Turning to FIG. 16 illustrating a master attribute 540 accompanied by a master attribute identifier 542 adapted to be associated with document (1) 544. When the master attribute 540 is selected it calls the other attributes 546 from the group of attributes the master attribute 540 relates to. FIG. 17 illustrates the association of all attributes from the group of attributes with document (1).

An exemplary group attributes management dialog 550 is illustrated in FIG. 18. The dialog 550 displays the name 552 of the group of attributes. Each attribute in the group is disposed on a row. Each row presents editable choices related to each attribute. In the present situation, column 554 identifies if the attribute is a master attribute, column 556 identifies the name of the attribute, column 558 identifies the value of the attribute and column 560 offers the choice of deleting the attribute from the group of attributes. Other attributes can be added 562 if desired.

Figures 19, 20:
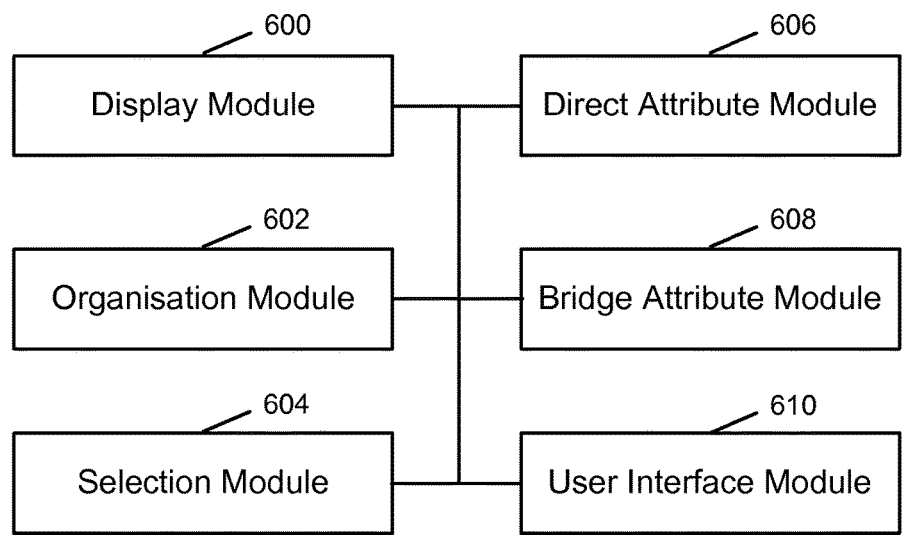
FIG. 19 illustrates an exemplary dialogue adapted to allow the management of access rights related to groups of attributes.
FIG. 20 illustrates an exemplary block diagram of a module-based system adapted to manage and use bridge attributes.

Access rights can be managed with another dialog as embodied in FIG. 19. Each group of attributes is illustrated on a row. Similarly with the dialog of FIG. 18, each column offers editable information. Namely, to enable or disable 570 the group of attributes, to which user or group of user 572 the group of attribute is accessible to and, inter alia, as understood, the name of each group of attributes 574. It is also possible to add 576 or delete 578 a group of attributes from the group of attribute access right management dialog 580.

Grouped attributes can evolve over time. At first, two attributes can be grouped together and later a third attribute can be added in the group. The evolution of each group of attributes can be illustrated over a timeline showing when each additional attribute has been added to the group of attribute and when attributes have been removed from the group of attributes. It is desirable to keep track of the time of entry and the time of extraction of each attribute in a group of attributes to have the possibility to retroactively modify attributes that have been associated with a document based on the use of the group of attributes.

Bridge Attributes

It is sometimes desirable to associate attributes to a document that do not categorize the document. This non-categorizing attribute is called a bridge attribute (or indirect attribute). It bridges the document to which it is associated [without further categorizing it] with other documents categorized by this bridge attribute [the bridge attribute is a direct attribute to them]. The bridge attribute, as opposed to a direct attribute, is associated with a document, or documents, because it builds a bridge, a link, leading to other relevant related documents. The same attribute thus can be a direct attribute for some documents and a bridge attribute for other documents. It is desirable that each direct attribute has its corresponding bridge attribute but it is not mandatory.

FIG. 20 illustrates a block diagram of a system capable of providing such mechanism. A display module 600 is provided to display documents and attributes; an organization module 602 adapted to organize documents with related attributes; a selection module 604 is adapted to select attributes and documents by a user; a direct attribute module 606 adapted to manage direct attributes; a bridge attributes module 608 adapted to manage bridge attributes and a user interface module 610 adapted to provide user interaction based, at least in part, on a graphical display of user-selectable elements adapted to offer choices to a user in order to establish a dialogue with the user.

Figure 21:
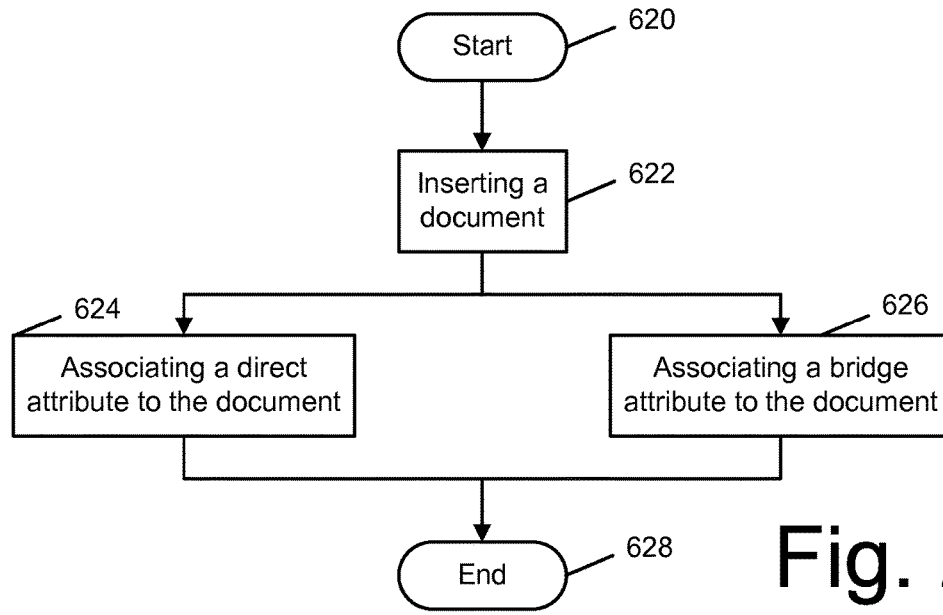
FIG. 21 illustrates an exemplary flow chart of steps performed to associate direct and bridge attributes to document(s)
Figure 22:
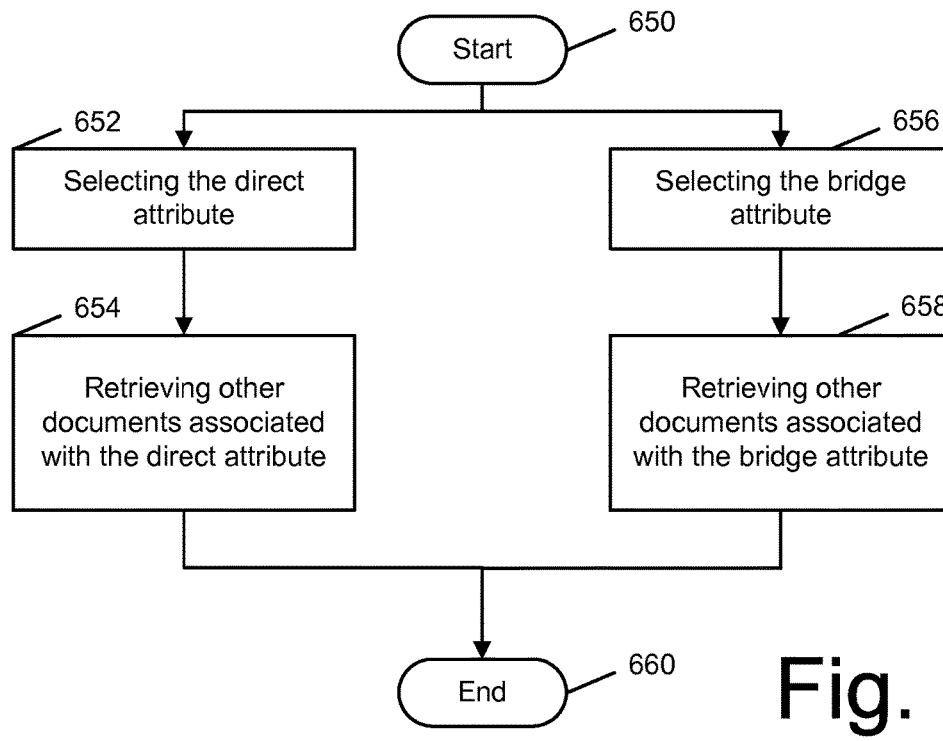
FIG. 22 illustrates an exemplary flow chart of steps performed to retrieve documents based, at least in part, on direct and bridge attributes to document(s)

Turning now to FIG. 21 illustrating an exemplary flow chart of a possible sequence of actions leading to the use of direct and bridge attributes. The sequence starts 620 with the insertion of a new document 622, or the insertion of many documents or the modification of attributes already associated with document(s) already entered in the system and the sequence ends 628. In contrast, in FIG. 22, an illustrative sequence of actions related to the use of direct and bridge attributes is shown. The sequence starts 650 by having the choice of either selecting one or more direct attributes 652 or selecting one or more bridge attributes 656. If a direct attribute has been selected 652 a query is launched to retrieve other documents directly associated with the direct attribute 654. In contrast, if a bridge attribute has been selected 656 a query is launched to retrieve other documents associated with the selected bridge attribute 658 before the process ends 660. The selection of either direct or bridge attributes is not exclusive and a mix of direct and bridge attributes can be made to build a query to retrieve relevant documents.

FIG. 23 illustrates a plurality of attributes that can be either directly associated with documents or bridge documents to other documents by being associated with documents as bridge attributes. FIG. 24 illustrates two documents, document (1) and document (2), associated with respective direct attributes A and E. FIG. 25 illustrates the same two documents of FIG. 24 with bridge attribute E [in dotted line] being associated with document (1). In so doing, bridge attribute E associated with document (1) builds a link, or a bridge to use the same wording, with document (2) because document (2) is directly associated with attribute E; the bridge being illustrated with the dotted line 670.

Lets use an example that patent people will understand to illustrate the current embodiment in relation with FIGS. 24, 25 and 26. Document (1) 800 is a USPTO form PTO/SB/07 used to file prior art related to a patent application with the USPTO in an Information Disclosure Statement (IDS). Document (1) 800 can be associated with attributes that could be 1) "document sent to USPTO" [because this document is sent by the applicant to the United States Patent and Trademark Office], 2) "PTO/SB/07" [the USPTO form identification], 3) "IDS" [that is the purpose of the document] and/or 4) "attorney's file number xxx" [that indicates to which matter number this document relates to]. These attributes work fine with document (1) 800 but it would be useful to have direct access to the actual patent document [illustratively document (2) 810] cited in document (1) 800 (USPTO form PTO/SB/07). Document (1) 800 (USPTO form PTO/SB/07) is not a patent document and therefore is not associated with the attribute E 806 "patent document". A bridge attribute E B806 "patent document" is therefore associated with document (1) 800 (USPTO form PTO/SB/07) despite the bridge attribute E B806 "patent document" is not categorizing document (1) 800 (USPTO form PTO/SB/07) [because document (1) 800 is not a patent document]. The bridge attribute E B806 "patent document" would lead to documents associated directly with attribute E 806, in the present situation the actual patent document (2) 810 cited in document (1) 800 (USPTO form PTO/SB/07) [here we assume there is only one patent publication to be cited in the IDS]. And, in turn, patent document (2) is directly associated with the [direct] attribute E 806 "patent document" that is actually correctly categorizing the patent document (2) 810. As one has understood from the figures, direct attributes are illustrated in solid lines and bridge attributes are illustrated in dotted lines.

Figure 27:
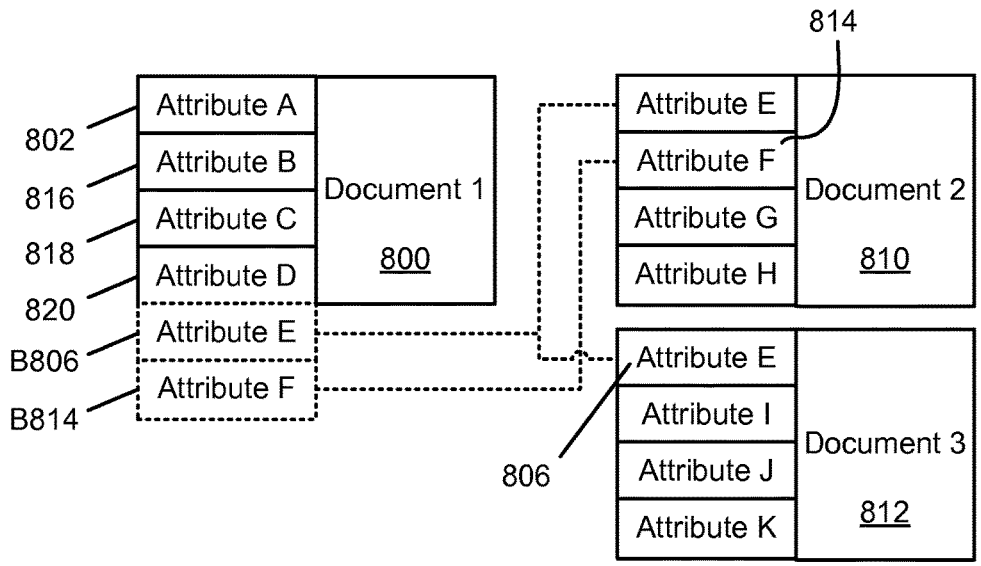
FIG. 27 illustrates the plurality of documents of FIG. 25 with bridge attributes E and F associated with document (1)
Figure 28:
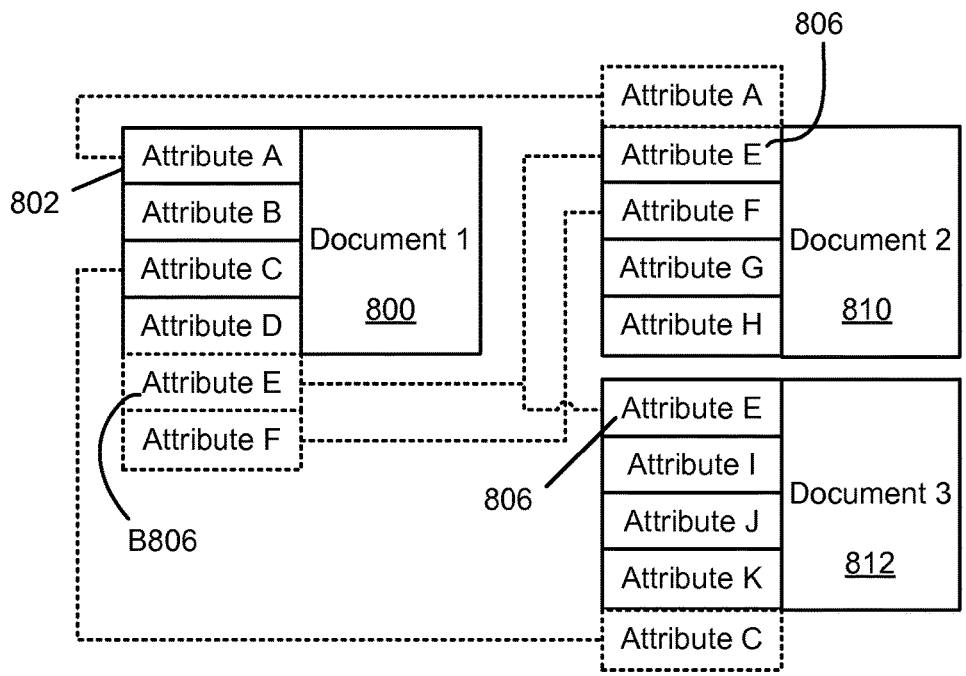
FIG. 28 illustrates the plurality of documents of FIG. 26 with additional bridge attributes associated with documents (1), (2) and (3).

Now referring more precisely to FIGS. 26, 27 and 28, document (1) 800 (USPTO form PTO/SB/07) is directly associated with attribute A 802 that is the "document sent to USPTO" attribute. The bridge attribute E B806 "patent document" is also associated with document (1) 800. The actual patent documents cited in the "IDS" of document (1) 800 are document (2) 810 and document (3) 812, both associated with attribute E 806.

Still referring to the exemplary embodiment of FIGS. 26, 27 and 28, the selection of attribute A 802 is adapted to launch a search to gather all documents having the attribute A 802 in common. Similarly, as mentioned above, it is desirable to allow an association with related documents not directly categorized by attribute A 802 but meaningful to document (1) 800 with a bridge attribute. The bridge attribute E 806 is a direct attribute associated with document (2) 810 and is a bridge attribute to document (1) 800. Thus, attribute E is an attribute to document (2) 810 and document (3) 812 and is a bridge attribute to document (1) 800.

FIG. 27 illustrates the graphical association between direct attributes A, B, C, D, E, F, G, H, I, J, K and their respective documents (1), (2), (3) 800, 810, 812 using boxes of solid lines. The bridge attribute E B806 is also graphically associated, illustratively using a dotted lined box to distinguish the bridge attribute E B806 from direct attributes illustrated in solid lines, with document (1) 800. The selection of direct attribute A from document (1) leads, when the attribute is selected in the context of a query, to other documents having the attribute A associated thereto. The selection of bridge attribute E B806 on document (1) 800 leads to document (2) 810 and document (3) 812, which neither share a direct common attribute with document (1) 800. The bridge attribute E B806 bridges document (1) with document (2) and (3) because they are relevant to document (1). In addition, other documents also associated with attribute E 806 will be provided if the bridge attribute E B806 was selected in the context of the building of a query.

FIG. 28 illustrates the documents of FIG. 27 with additional bridge attributes associated therebetween. One can appreciate that document (2) is associated with direct attribute E, F, G, H and bridge attribute A. Bridge attribute A draw a connection with document (1) despite document (2) has no common direct attribute with document (1). Similarly, one can also appreciate that document (3) is associated with direct attribute E, I, J, K and bridge attribute C. Bridge attribute C draw a connection with document (1) despite document (3) has no common direct attribute with document (1). As it is shown, bridge attributes can be used in both directions.

A computer-readable medium including computer-executable instructions for performing a method of discriminating documents, the method comprising: displaying a first array of documents; receiving instructions from the selection of an attribute associated with at least one document; displaying a second array of documents grouping documents having the selected attribute; and displaying documents associated with the selected attribute with a graphical discriminating feature.

The computer-readable medium of claim 1, wherein the graphical discriminating feature is displayed on the first array of documents.

The computer-readable medium of claim 1, wherein the graphical discriminating feature is displayed on the second array of documents.

The computer-readable medium of claim 1, wherein the graphical discriminating feature is associated with a transition between the first array of documents and the second array of documents.

The computer-readable medium of claim 1, wherein the graphical discriminating feature is a displacement of documents having the selected attribute from the first array of documents to their respective positions on the second array of documents.

The computer-readable medium of claim 1, wherein the graphical discriminating feature is applied on the documents having the selected attribute on the first array of documents and the second array of documents.

The computer-readable medium of claim 1, wherein the graphical discriminating feature is selected from a group consisting of a document color, a document frame, a document texture, a document animation.

The computer-readable medium of claim 1, wherein the graphical discriminating feature is progressively applied to the documents.

The computer-readable medium of claim 1, wherein the display of the second array of documents triggers the removal of the first array of documents.

In a computing device, a method of discriminating documents, the method comprising: displaying a first array of documents; receiving instructions about the selection of an attribute associated with at least one document; displaying a second array of documents grouping documents having the selected attribute; and displaying documents associated with the selected attribute with a graphical discriminating feature.

A system for discriminating documents comprising: a display module adapted to display arrays of documents; a selection module adapted to manage a signal provided by a selection of an attribute; and a discriminating feature module adapted to apply discriminating features to documents having the selected attribute.

A graphical user interface adapted to graphically discriminate documents from a first array of documents that are also displayed on a second array of documents to show which documents from the first array of documents are on the second array of documents.

A computer-readable medium including computer-executable instructions implementing a method of discriminating documents, the method comprising: associating a first graphical discriminator with a first attribute; associating a second graphical discriminator with a second attribute; and displaying the first graphical discriminator and the second graphical discriminator with a document having the first attribute and the second attribute associated therewith. The computer-readable medium of claim 13, wherein the graphical discriminator is selected from a group consisting of a color and a shape.

The computer-readable medium of claim 13, wherein the attribute is a value.

In a computing device, a method for graphically associate a plurality of attributes with documents, the method comprising: providing a group of graphical discriminators associated with attributes and analogous to poker chips design; displaying graphical discriminators, associated with attributes associated with a document, with the document.

A computer-readable medium including computer-executable instructions providing a method of grouping documents, the method comprising: associating a plurality of attributes therewith; providing a document; selecting at least one attribute from the plurality of attributes; providing at least a some of the remaining attributes from the plurality of attributes; and associating at least one attribute from the plurality of attributes with the document.

The computer-readable medium of claim 17, wherein at least one attribute from the plurality of attributes comprises the attribute and a value associated therewith.

The computer-readable medium of claim 17, wherein the plurality of attributes is adapted to be associated with a workspace.

The computer-readable medium of claim 19, wherein the plurality of attributes is a cluster of attributes, further comprising providing a plurality of clusters of attributes adapted to respectively be associated with workspaces.

The computer-readable medium of claim 19, wherein at least one attribute from the plurality of attributes is a master attribute adapted to call the other attributes from the plurality of attributes.

The computer-readable medium of claim 19, wherein the plurality of attributes is adapted to be shared with a plurality of users.

In a computing device, a method for graphically associating a plurality of attributes with documents, the method comprising: associating a plurality of attributes therewith; providing a document; selecting at least one attribute from the plurality of attributes; providing at least a some of the remaining attributes from the plurality of attributes; and associating at least one attribute from the plurality of attributes with the document.

A system for grouping documents to be associated with a document, the system comprising: a display module adapted to display documents; a grouped attributes module adapted to group attributes; and a selection module adapted to receive instructions from a selection of an attribute.

A computer-readable medium having computer-readable code stored thereon providing a method of associating attributes with a document, the method comprising: directly associating a first attribute with a first document; directly associating a second attribute with a second document; and indirectly associating the second attribute with the first document, the second attribute being a bridge attribute to the first document.

The computer-readable medium of claim 25, wherein the bridge attribute does not categorize the first document and draws a link between the first document and the second document.

A method of associating attributes with a document, the method comprising: directly associating a first attribute with a first document; directly associating a second attribute with a second document; and indirectly associating the second attribute with the first document, the second attribute being a bridge attribute to the first document.

The method of claim 27, wherein the bridge attribute does not categorize the first document and draws a link between the first document and the second document.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable storage medium for tangibly storing computer-readable code thereon suitable for execution by a computing apparatus, the computer-readable code, when executed, being adapted to implement a method for visually indicating on a display those user-selectable elements that have been displayed in a plurality of independent user-selectable elements based on a user-selected attribute, the method comprising:
  (a) providing a group of user-selectable elements, at least some of which are associated with one or more attributes;
  (b) displaying user-selectable elements of the group of user-selectable elements along a first axis displaying a single juxtaposition of user-selectable elements according to a first predetermined collation function along a generally rectilinear orientation, each user-selectable element being graphically represented, the user-selectable elements being spaced apart from each other according to the first predetermined collation function;
  (c) with respect to a user-selected attribute of one of the group of user-selectable elements that is associated with one or more attributes,
    (i) receiving user input representing the user-selected attribute;
    (ii) displaying user-selectable elements of the group of user-selectable elements along a second axis, independent from the first axis, the second axis displaying a single juxtaposition of user-selectable elements according to a second predetermined collation function along a generally rectilinear orientation, each user-selectable element being graphically represented, the user-selectable elements being spaced apart from each other according to the second predetermined collation function;
    (iii) identifying, on the second axis, each user-selectable element of the group of user-selectable elements that has the user-selected attribute; and
    (iv) displaying a visual distinctive feature for each displayed user-selectable element along the second axis that has the user-selectable attribute,
  whereby a user is able to visualize which user-selectable elements have the user-selected attribute along the second axis.

2. The non-transitory computer-readable storage medium tangibly storing computer-readable code thereon for implementing the method of claim 1, wherein the first axis is displayed adjacent and parallel to the second axis.

3. The non-transitory computer-readable storage medium tangibly storing computer-readable code thereon for implementing the method of claim 1, wherein the second axis is displayed at an angle in respect to the first axis and intersects or abuts the first axis at a displayed document on the first axis having the user-selected attribute.

4. The non-transitory computer-readable storage medium tangibly storing computer-readable code thereon for implementing the method of claim 1, wherein at least one of the collation functions is a chronological order thereof.

5. The non-transitory computer-readable storage medium tangibly storing computer-readable code thereon for implementing the method of claim 1, wherein the user-selectable elements simultaneously displayed in the first and second axes are adapted to be axially aligned on their respective axes to provide a graphical transversal alignment thereof.

6. The non-transitory computer-readable storage medium tangibly storing computer-readable code thereon for implementing the method of claim 1, wherein, with respect to the user-selected attribute, the visual distinctive feature is adapted to be selectively displayed.

7. The non-transitory computer-readable storage medium tangibly storing computer-readable code thereon for implementing the method of claim 1, wherein, with respect to the user-selected attribute, the visual distinctive feature is selected from a group consisting of a pattern, a border and a color.

8. The non-transitory computer-readable storage medium tangibly storing computer-readable code thereon for implementing the method of claim 1, wherein, with respect to the user-selected attribute, the visual distinctive feature is progressively applied to the user-selectable elements.

9. The non-transitory computer-readable storage medium tangibly storing computer-readable code thereon for implementing the method of claim 1, further comprising
  (i) identifying on the first axis each user-selectable elements from the group of user-selectable elements that has the user-selected attribute; and
  (ii) displaying the visual distinctive feature for each displayed user-selectable element along the first axis that has the user-selectable attribute;
whereby a user is able to visualize which user-selectable elements have the user-selected attribute along the first axis.

10. The non-transitory computer-readable storage medium tangibly storing computer-readable code thereon for implementing the method of claim 1, wherein, with respect to the user-selected attribute, the visual distinctive feature is displayed in connection with user-selectable elements along the first axis that are displayed in connection with any user-selectable element along the first axis that is not displayed on the second axis.

11. The non-transitory computer-readable storage medium tangibly storing computer-readable code thereon for implementing the method of claim 1, wherein the implemented method further comprises displaying an animation showing a movement of one or more of user-selectable elements that are displayed on the two axes.

12. The non-statutory computer-readable storage medium tangibly storing computer-readable code thereon for implementing the method of claim 1, wherein the user-selected attribute comprises a value.

13. A method for visually indicating on a display those user-selectable elements that have been copied from one axis of user-selectable elements to another axis of user-selectable elements based on a user-selected attribute, the method comprising:
  (a) providing a group of user-selectable elements, at least some of which are associated with one or more attributes;
  (b) displaying user-selectable elements of the group of user-selectable elements along a first axis displaying a single juxtaposition of user-selectable elements according to a first predetermined collation function along a generally rectilinear orientation, each user-selectable element being graphically represented, the user-selectable elements being spaced apart from each other according to the first predetermined collation function;
  (c) with respect to a user-selected attribute of one of the group of user-selectable elements that is associated with one or more attributes,
    (i) receiving user input representing the user-selected attribute;
    (ii) displaying user-selectable elements of the group of user-selectable elements along a second axis, independent from the first axis, the second axis displaying a single juxtaposition of user-selectable elements according to a second predetermined collation function along a generally rectilinear orientation, each user-selectable element being graphically represented, the user-selectable elements being spaced apart from each other according to the second predetermined collation function;

(iii) identifying, on the second axis, each user-selectable element of the group of user-selectable elements that has the user-selected attribute; and (iv) displaying a visual distinctive feature for each displayed user-selectable element along the second axis that has the user-selectable attribute, whereby a user is able to visualize which user-selectable elements have the user-selected attribute along the second axis.

14. The method of claim 13, wherein the first axis is displayed adjacent and parallel to the second axis.

15. The method of claim 13, wherein the second axis is displayed at an angle in respect to the first axis and intersects or abuts the first axis at a displayed user-selectable element on the first axis having the user-selected attribute.

16. The method of claim 13, wherein at least one of the collation functions is a chronological order thereof.

17. The method of claim 13, wherein the user-selectable elements simultaneously displayed in the first and second axes are adapted to be axially aligned on their respective axes to provide a graphical transversal alignment thereof.

18. The method of claim 13, wherein, with respect to the user-selected attribute, the visual distinctive feature is adapted to be selectively displayed.

19. The method of claim 13, wherein, with respect to the user-selected attribute, the visual distinctive feature is selected from a group consisting of a pattern, a border and a color.

20. The method of claim 13, wherein, with respect to the user-selected attribute, the visual distinctive feature is progressively applied to the user-selectable elements.

* * * * *